US006055521A

United States Patent [19]

Ramsey et al.

[11] Patent Number: 6,055,521

[45] Date of Patent: *Apr. 25, 2000

[54] UNATTENDED AUTOMATED SYSTEM FOR SELLING AND DISPENSING FLUIDS, WITH CHANGE-DISPENSING CAPABILITY

[75] Inventors: Furman D. Ramsey, Greensboro, N.C.; James Williams, Belvedere, Ill.

[73] Assignee: JTW Operations, Machesny Park, Ill.

[ * ] Notice: This patent is subject to a terminal disclaimer.

[21] Appl. No.: 09/192,621

[22] Filed: Nov. 13, 1998

Related U.S. Application Data

[63] Continuation of application No. 08/685,352, Jul. 23, 1997, Pat. No. 5,842,188, which is a continuation-in-part of application No. 08/403,220, Mar. 13, 1995.

[51] Int. Cl.[7] ...................... G06F 17/60

[52] U.S. Cl. ...................... 705/413; 222/2; 453/2; 700/232

[58] Field of Search ...................... 194/215, 217, 194/344, 346; 222/2; 364/479.02; 453/2; 705/413; 700/232

[56] References Cited

U.S. PATENT DOCUMENTS

| | | | |
|---|---|---|---|
| 3,608,690 | 9/1971 | Morrow et al. | 194/206 |
| 3,682,183 | 8/1972 | Morrow et al. | 221/79 |
| 3,786,421 | 1/1974 | Wostl et al. | 235/381 |
| 3,931,497 | 1/1976 | Gentile et al. | 235/381 |
| 3,935,435 | 1/1976 | Greenwood | 705/413 |
| 4,347,924 | 9/1982 | Hayashi et al. | 194/346 |
| 4,499,985 | 2/1985 | Schuller | 194/217 |
| 4,512,453 | 4/1985 | Schuller et al. | 194/200 |
| 5,183,142 | 2/1993 | Latchinian et al. | 194/206 |
| 5,555,965 | 9/1996 | Mishina | 194/217 |
| 5,685,435 | 11/1997 | Picioccio et al. | 209/667 |
| 5,842,188 | 11/1998 | Ramsey et al. | 705/416 |
| 5,895,457 | 4/1999 | Kurowski et al. | 705/413 |

*Primary Examiner*—Edward R. Cosimano
*Attorney, Agent, or Firm*—Vedder, Price, Kaufman & Kammholz

[57] ABSTRACT

A system for selling and dispensing of fluids, with change-making capability permits and the unattended sale and dispensing of motor fuels. The system may be incorporated either directly into a motor fuel pump or it may be incorporated into a module that may be installed either in a motor fuel pump or on a fueling island in association with the motor fuel pump. A cash acceptor is provided that accepts either currency or coin as a payment for a motor fuel purchase and the system further includes a change dispenser for disbursing change to a purchaser. The change dispenser includes two different change payout mechanisms that give cash back to a purchaser as change for a motor fuel purchaser. The change is dispensed in currency, or coin, or a combination of both. A controller is provided that links the cash acceptor, fuel pump and change dispenser together so that the value of cash deposited with the system is identified and the motor fuel pump is enabled.

29 Claims, 17 Drawing Sheets

UNATTENDED AUTOMATED SYSTEM FOR SELLING AND DISPENSING FLUIDS, WITH CHANGE-DISPENSING CAPABILITY

REFERENCE TO RELATED APPLICATIONS

This application is a continuation of prior application Ser. No. 08/685,352, filed Jul. 23, 1997, which issued as U.S. Pat. No. 5,842,188, said application Ser. No. 08/685,352 being a continuation-in-part application of prior application Ser. No. 08/403,220, filed Mar. 13, 1995.

BACKGROUND OF THE INVENTION

The present invention relates generally to systems for selling and dispensing consumer products and services, and more particularly to systems which enable an unattended automated service station to sell and dispensing products, particularly motor fuel, by accepting cash and returning change due to the purchaser for the transaction.

Heretofore, equipment has been provided at service stations which permits the remote enablement of gasoline dispensers by an attendant-controlled terminal located within the service station. In such equipment, the terminal is located in the sales office of the service station away from the island which contains the fuel pump dispensers. This type of system may be considered as only partly automated because only the attendant can enable the fuel dispensing pumps from within the service station. This remote enablement feature is beneficial because it prevents the theft of motor fuel from such a service station.

U.S. Pat. No. 3,786,421 discloses a system which permits a purchaser to purchase and dispense motor fuel by inserting a credit or debit card into a card reader on the fueling island. Although this system represents an improvement over the attendant-controlled fueling islands described above, it can only be actuated by a credit or debit card and is not capable of either receiving cash as payment for the transaction from the purchaser or giving change from the transaction back to the customer.

U.S. Pat. No. 3,931,497, which issued Jan. 6, 1976, discloses an automatic fuel dispenser which is actuated by the receipt of either a valid credit card or cash to establish a pre-established dispensing limit for a particular quantity of motor fuel up to the limit of the cash deposited or credit card limit inputted by the user. Although this system is an improvement over the system described above in U.S. Pat. No. 3,786,421, it suffers from certain inherent disadvantages because it is not a completely self-sufficient system and it has no ability to accept any amount of cash as payment for motor fuel or make exact change for a purchase of motor fuel.

U.S. Pat. No. 3,935,435, issued Jan. 27, 1976 describes an automatic gasoline dispenser which is an improvement over the system described above in U.S. Pat. No. 3,931,497 because it describes a system which is purchaser driven. A purchaser inserts tokens into the fuel dispenser to build up credit for a defined quantity of fuel. The system calculates the quantity of fuel dispensed by sensing fluid pulses and computes the amount of change due the purchaser, if any. Coins are dispensed to the purchaser as change. However, this type system is not without its peculiar faults because it requires a customer to purchase tokens in advance from a separate facility and therefore cannot act as a fully automated gasoline dispenser. It is also incapable of accepting cash as payment and calculating change from the inserted cash. Additionally, this system carries a limited amount of coins as a change supply and requires that the change supply be monitored.

The convenience of unattended automated service and selling stations for selling and dispensing items, particularly fuel, has created an ever-increasing need for such technology, and it is to that need that the present invention is directed. Additionally, state laws restrict the maximum amount of motor fuel that may be purchased for a particular grade of motor fuel at a single time from a single motor fuel dispenser. Unattended service stations using automated motor fuel dispensers must therefore have a limiting feature to comply with such laws. Still further, in unattended service stations having automated fuel dispensers which accept both cash and credit or debit cards, it is desirable to have a means for controlling the two different acceptors which control means has the ability to disable one acceptor while the other acceptor is enabled.

None of the prior art service station systems described above discloses a system which accepts cash as payment for a fuel purchase and provides change in the form of cash, i.e. currency or coins, for the purchase and further recycles coins inserted as payment into a change supply, nor a system in which cash acceptors and credit acceptors are controlled together to enable the operation of only one acceptor during the transaction. The prior art therefore falls short of providing a system which completely automates a service station for dispensing of motor fuel.

SUMMARY OF THE INVENTION

It is therefore a general object of the present invention to provide a system for use in an unattended, automated service station for use in the selling and dispensing of products and services, principally motor fuel, that overcomes the disadvantages of the prior art systems mentioned hereinabove.

More specifically, it is an object of the present invention to provide an automated dispensing system which permits the reduction of manpower and labor costs in the operation of a service station and which permits the virtually unattended operation of a service station from a remote control facility.

Another object of the present invention is to provide a system for use with unattended service stations for the unattended and automated dispensing and selling of motor fuel which receives and computes the value of cash inserted for payment into the system and which maintains a storage of cash in the form of currency and coins in order to provide change to the customer.

Still another object of the present invention is to provide a system for operation of an unattended service stations for automated dispensing and selling of motor fuel which is purchaser-activated, the system having cash acceptance and dispensing means associated with a fuel pump and a controller which interfaces between the cash acceptance and dispensing means and the fuel pump, the cash acceptance and dispensing means, receiving cash inserted by the purchaser for payment of motor fuel, calculating the value of the inserted cash, identifying the value of the cash inserted to the controller, the controller enabling the fuel pump to dispense a quantity of motor fuel corresponding to the amount of cash inserted into the system, the system having a change supply in the form of currency and coins for providing change to the purchaser and the system further including means for recycling coins inserted into the cash acceptance and dispensing means as change for the motor fuel purchase.

In still another object of the present invention, the system includes a foreign conversion program which converts foreign currency deposited into the system into a local currency whereby the systems may be implemented at unattended service stations near border crossings.

Still another object of the present invention is to provide a system for operating an unattended, automated service station for dispensing gasoline and other motor fuels in which the system is capable of accepting cash in the form of either currency or coins as payment for the dispensing of a specific quantity of gasoline, the system being further capable of dispensing exact change to a customer in the form of currency, coins or both, the system having a supply of currency for dispensing as change and a supply of coins for dispensing as change, the system having means for sorting coins inserted therein for payment and reusing such coins as change.

In still another object of the present invention, an unattended service station is provided for dispensing motor fuel, the service station including at least one fueling island having a fuel dispenser in the form of a fuel pump for dispensing motor fuel, an automated vending machine for accepting cash from a customer as payment for motor fuel and for dispensing cash as change, if needed, as part of the motor fuel purchase and a control means for interfacing with the fuel dispenser and the vending machine for enabling the fuel dispenser to dispense designated quantities of motor fuel in response to the cash value calculated by the vending machine.

As exemplified in one embodiment, the present invention encompasses a system for an unattended automated service station for the selling of and dispensing of products and services, primarily motor fuel, which includes means indicating the quantity of fuel dispensed; card reader means identifying indicia carried by a credit card and generating signals indicative of the indicia; card verification means for verifying the credit state of a credit card; coin and currency acceptor means for receiving direct payment for a quantity of fuel to be dispensed; receipt printing means for generating credit card and cash purchase receipts; fuel dispensing activating means for enabling the fuel dispensing means to dispense fuel; data transmission means interconnecting the various components of the system with other components to remote verifying and information services; and a process control means interconnected to the credit card reader means, the coin and currency acceptor means, the credit card verification means, coin and currency dispensing means, the receipt printing means, the display means, the audio means, and the receipt generating means, the process control means being responsive to receive data transmitted from the card verification means and the card acceptor means to activate the fuel dispensing means for delivering a specific quantity, generating a receipt, activating the coin and currency dispensing means to deliver an exact amount of change in coins and currency, and terminating the operation of the system.

As described in another embodiment of the present invention, an unattended automated service station system includes at least one motor fuel dispenser, a control means for controlling the operation of the fuel dispenser and a cash acceptance and dispensing console which acts, in effect, as a vending machine to receive cash in the form of currency or coin from a customer for purchase of motor fuel, the control means receiving the cash amount deposited into the cash console as an input signal from the cash console and enabling the fuel dispenser to dispense motor fuel up to that amount.

In an important aspect of the invention, the cash console includes a change supply and means for calculating change due to a purchaser and dispensing the change to the customer. This change means is operated upon a signal from the control means after the fueling has stopped for a particular time duration. Once the fueling is stopped for this duration and the quantity of motor fuel does not exceed the amount inserted for the transaction, the control means disables operation of the fuel dispenser, i.e., it prevents further dispensing of motor fuel and subsequently enables the dispensing of change. The cash console has a coin recycling feature so that certain coins deposited as payment by the purchaser are recycled into a change supply, thus increasing the self-sufficiency of the invention and reducing the amount of servicing required by the system.

These and other objects, features and advantages of the present inventions will be apparent through a reading of the following detailed description, taken in conjunction with the accompanying drawings, wherein like reference numerals refer to like parts.

BRIEF DESCRIPTION OF THE DRAWINGS

Throughout the course of this detailed description, reference will be made to the following drawings in which.

DETAILED DESCRIPTION OF THE PREFERRED EMBODIMENTS

A First Embodiment of the Invention

It will be understood that although the following detailed description is set forth in terms of an unattended service station having a plurality of gasoline dispensing islands, systems of the present invention may find equal utility in the operation of other automated vending or selling stations where consumer products such as food, drinks, cigarettes, candies, nonprescription drugs and others may be sold.

The Service Station

Figure 1:
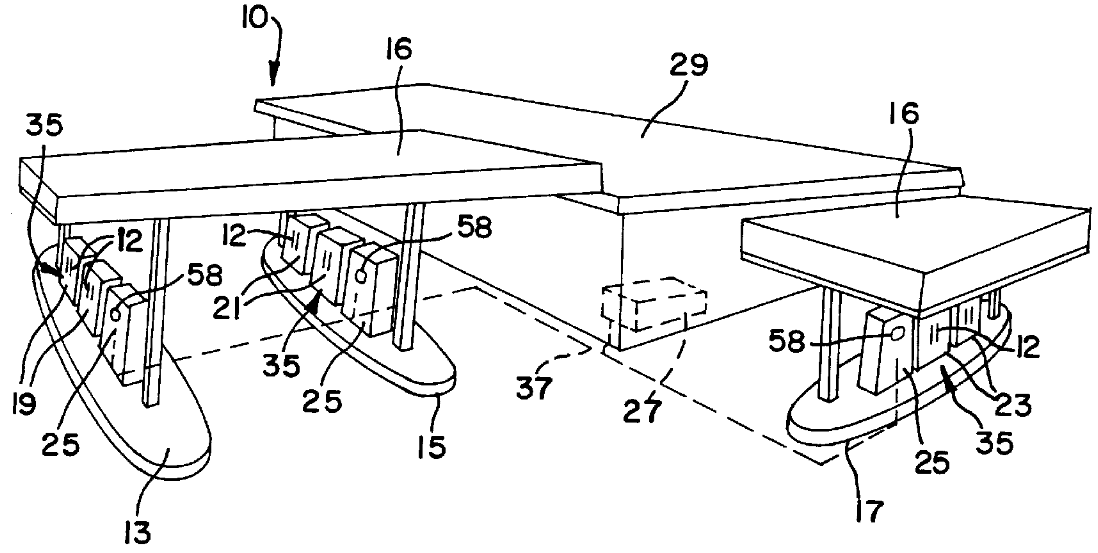
FIG. 1 is a perspective view of a motor fuel service station incorporating an unattended selling and dispensing system constructed in accordance with the principles of the present invention.

Referring now to FIG. 1, an unattended service station 10 is shown as having a plurality of gasoline-dispensing or fueling islands 13, 15, 17 each of which is shown as having a separate, two-sided gasoline pump station 19, 21, 23 shown generally in the Figures as fuel pumps dispensers 35 with conventional vehicle-engaging nozzles. Each side of the dispensers 19, 21, 23 may have anywhere from between one to five fuel outlets 12 for dispensing separate types of fuels, for example, regular, midgrade, premium, and diesel fuel.

The Pump Control Console

Figure 2:
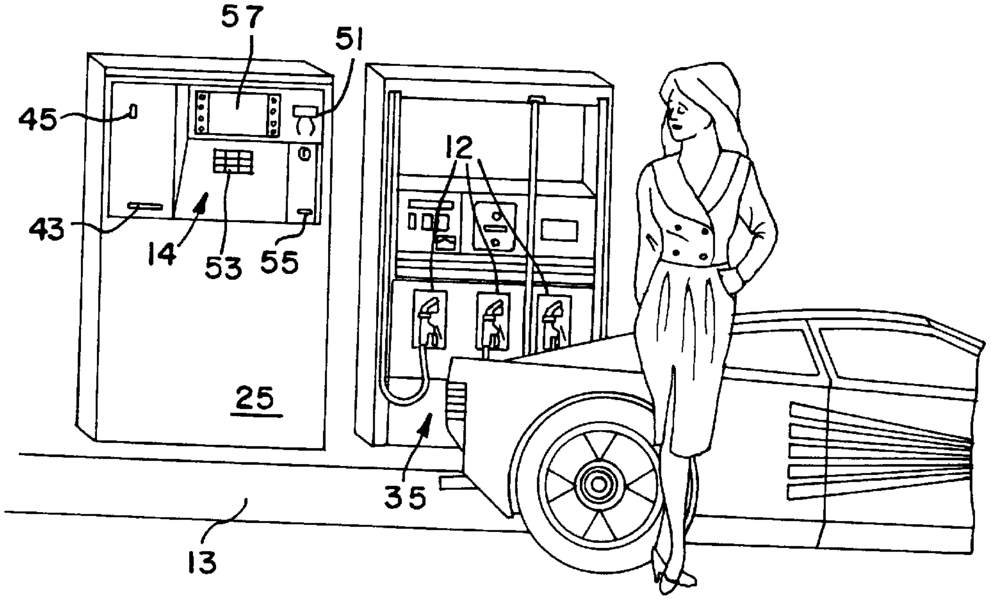
FIG. 2 is an enlarged perspective view of a fuel island of the service station of FIG. 1 incorporating one embodiment of the system of the present invention and illustrating a customer in place at the customer console thereof.
Figure 3:
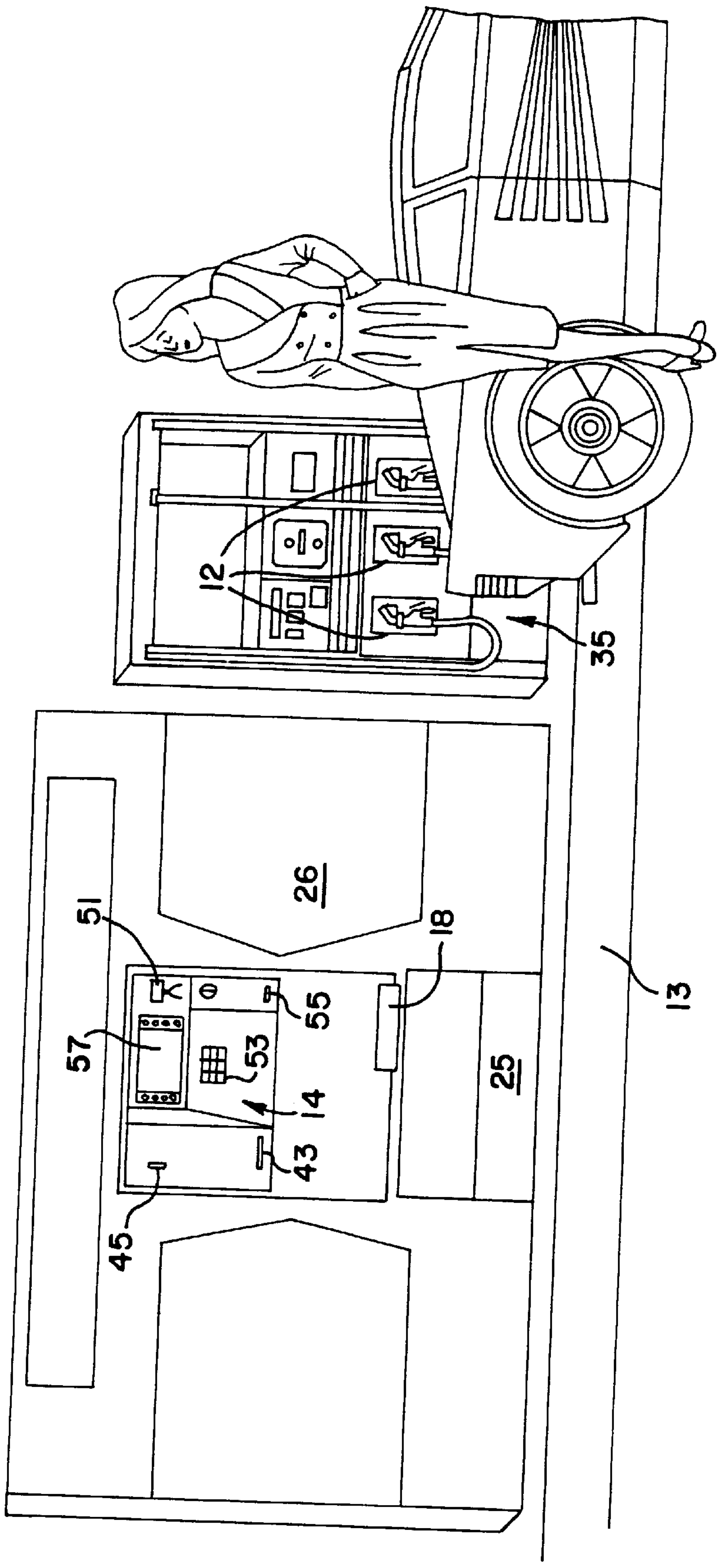
FIG. 3 is an enlarged perspective view of an alternate embodiment of a customer console in place at a fueling island which dispenses consumer products other than motor fuel.

Apparatus of the present invention includes a customer engaging console 25 closely associated in proximity and function with gasoline dispensers 19, 21, 23 that are shown illustrated in FIGS. 2 & 3 as in place upon one of the islands. This console 25 is preferably soundly constructed to be theft- and weatherproof and designed to house the majority of the components used in the system shown more specifically in FIGS. 4 & 7.

Figure 4:
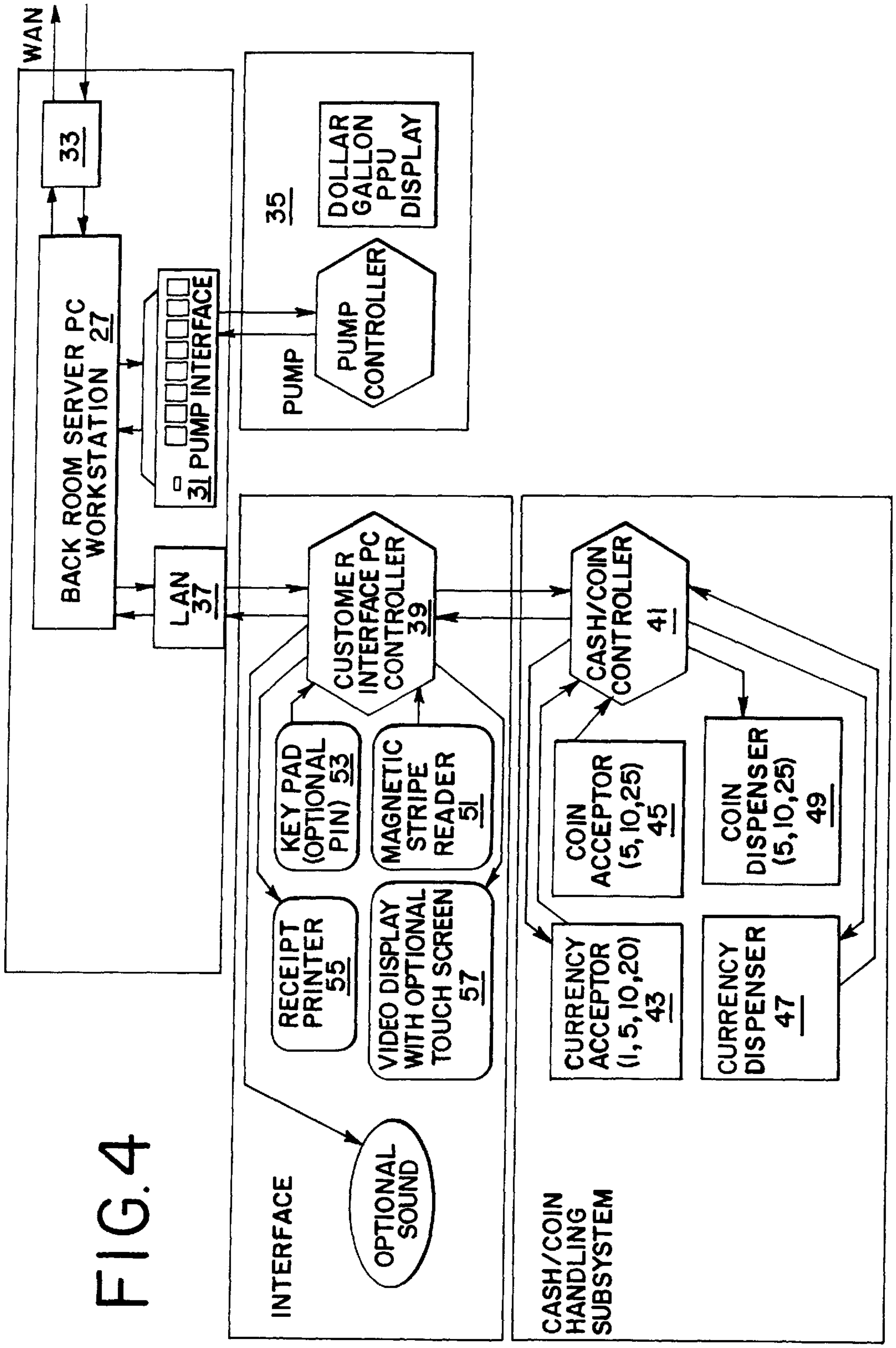
FIG. 4 is a functional block diagram illustrating of the connected components of the first embodiment of the present invention.

In a first embodiment of the present invention as shown in FIGS. 1 & 4, a facility server 27 is located within a separate closed facility 29 remote from the fueling islands 13, 15, 17 in order to provide a control center for all of the consoles and fueling islands of the service station 10. The facility server 27, by way of a suitable transmission means 33, has suitable wide area network ("WAN") connections to gather all off-site information necessary for the efficient operation of the system including, but not limited to, credit card verification and other information needed in day-to-day operation of the service station 10.

The facility server 27, through an interface 31, controls the activation and deactivation of the fuel dispensers 35 which continually display sales indicia for the purchaser, such fuel price and fuel quantity units, on a conventional fuel pump display. The server 27, through another transmission means, preferably in the form of a suitable local area network ("LAN") 37, also connects with a customer interface controller 39 in the form of a personal computer ("PC") order to clear a credit sale transaction and activate fuel dispensation after such transaction has been cleared, or after a cash purchase has been initiated. In instances concerning the latter type of purchase, the controller 39 is connected to a cash coin controller, or validator 41, which in turn has two-way communication with a currency acceptor 43. Controller 41 also receives input from coin acceptor 45, and has two-way communication with currency dispenser 47, as shown in FIG. 4 in order to control coin dispensation through coin dispenser 49.

In the embodiment illustrated in FIGS. 1–6, a credit card reader 51 is provided as a peripheral aspect of the invention in order to enable the system to process credit or debit-type sales. This credit card reader 51 transmits information to controller 39. An optional numerical key pad 53 is provided so that a purchaser may enter a PIN ("personal identification number") when using a credit or debit card as payment for the transactions. The keypad 53 is similarly connected to the controller 39 and assists in prohibiting fraudulent access to the credit card reader and mechanism associated therewith. A receipt printer 55 may also provided which is activated by the controller 39 to provide a transaction receipt of the purchase regardless of whether the purchase is credit card or cash-based. A video display 57 may be provided on the console 25 which is controlled by controller 39 in order to provide additional fueling instructions or other important information about products for sale, or locations of interest to the purchaser. There is an optional provision for a touch-panel type display to facilitate customer selections by touching simulated buttons on the screen. A similar video display 58 may be incorporated in each of the fuel pump stations 19, 21 and 23 to display messages sent by the controller 39.

Figure 5:
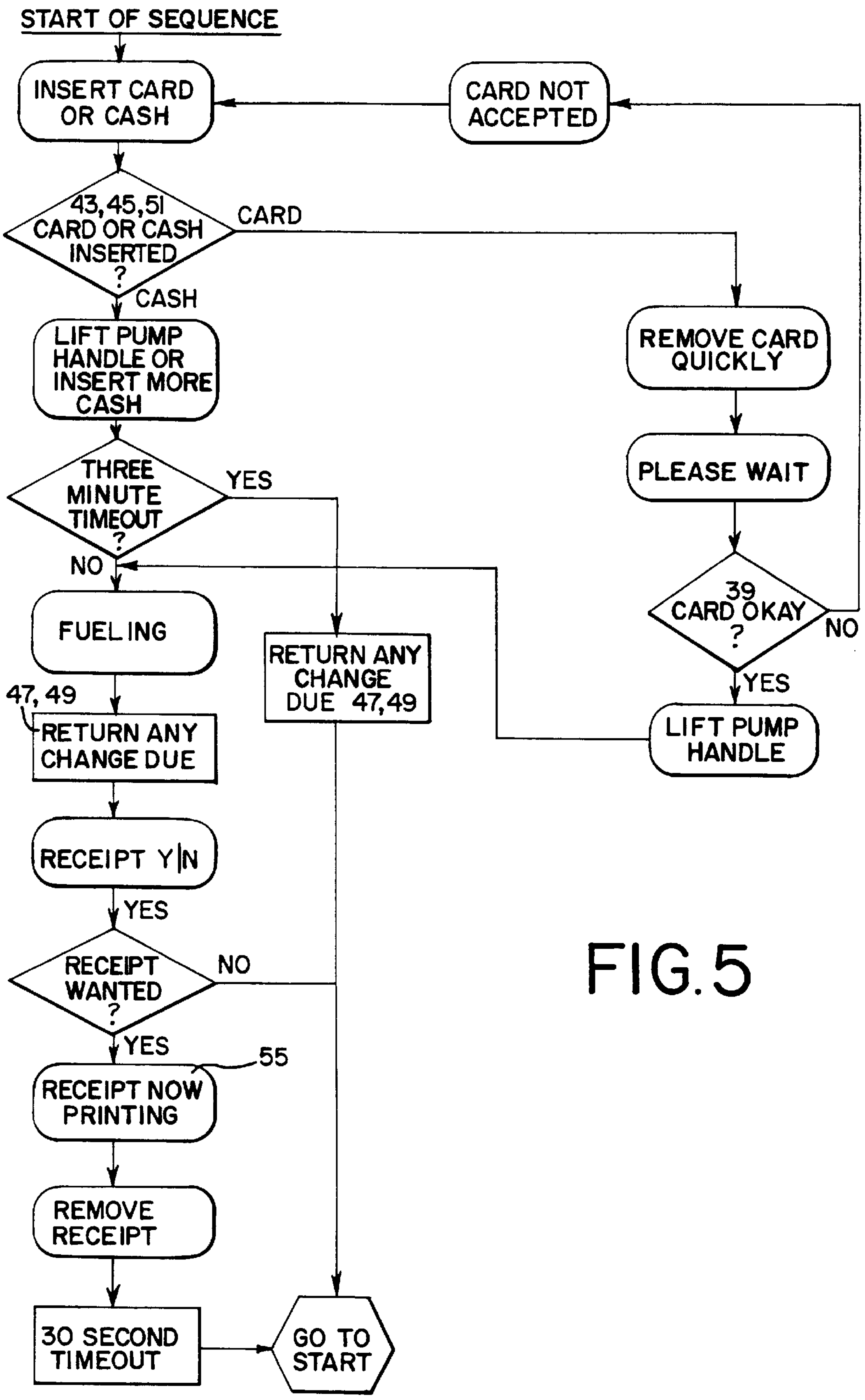
FIG. 5 is a flow chart illustrating the basic control sequence executed by the components of the system of FIG. 4.
Figure 6:
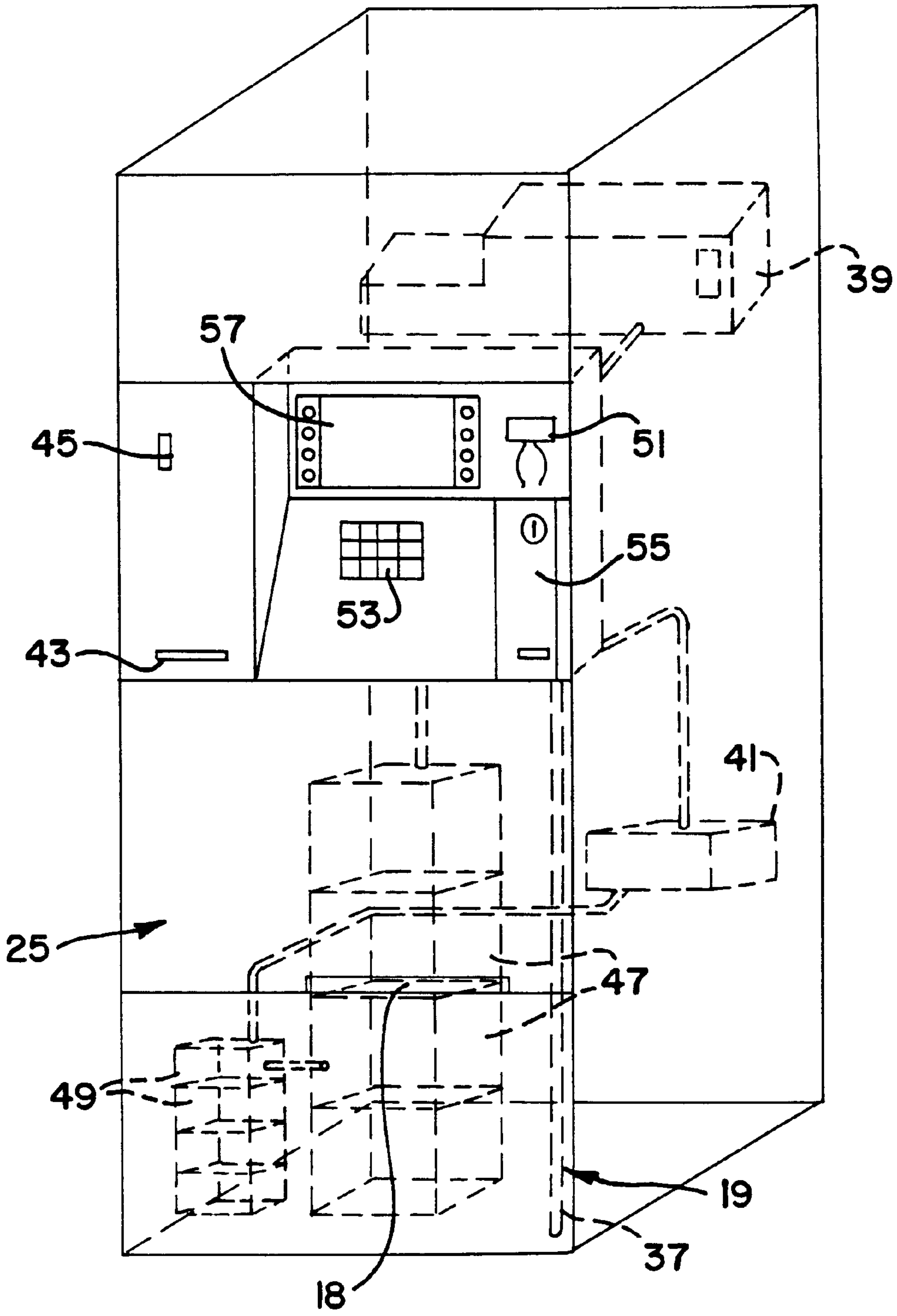
FIG. 6 is an enlarged, isolated view of the customer console of FIG. 2 utilized in the first embodiment of the present invention.

With particular reference now to FIG. 5, which illustrates the operational sequence of the system of the present invention, it can be seen that controller 39 controls the processing and management of the customer control console 25. The operational activities with respect to the controller 39 pertaining to a credit or debit card purchase of fuel may be summarized as follows: (1) data is received from card reader 51 which includes information read from the customer's credit card, by way of its magnetic stripe, and is manipulated to provide output commands to the server 27 for off-site verification; (2) an accepted card verification signal is received by the controller 39 which then enables the interface 31 of the system to activate the appropriate dispenser 35; (3) fueling commences and audio instructions or information may be provided during the fueling period; and (4) fueling is completed and an optional receipt is available from receipt printer 55 through controller 39.

In the event a cash purchase of motor fuel is desired by the purchaser, cash, such as either currency or coins are inserted into either or both of the currency and/or the coin acceptors 43, 45. The value of the cash inserted into the currency and coin acceptors 43, 45 is sent to the controller 39 which activates the pump 35 to dispense a fuel quantity equal to the amount deposited by the purchaser. Upon the completion of fueling, the purchased is compared to the amount of cash inserted and price of the fuel cash and/or coins that are due from the transaction are returned by way of activation of currency dispenser 47 and/or coin dispensers 49 upon initiation by controller 41 subsequent to receiving a signal from the controller 39 that fueling at the dispenser 35 has stopped. An optional receipt is available, and after a suitable time elapses, the system recycles to the start position.

In order to effectuate providing the purchaser with change for his or her purchase of fuel, the currency and coin dispensers 47, 49 preferably contain distinct supplies of different denominations of currencies and coins. As illustrated in FIG. 4, the currency dispenser 47 contains a supply of the following different denominations of currency: 1-dollar bills, 5-dollar bills, 10-dollar bills and 20-dollar bills, while the coin dispenser 49 contains a supply of the following different denomination coins: pennies, nickels, dimes and quarters. Upon command from a signal from the controller 41, the dispensers 47, 49 will make appropriate change to the purchaser, which may be dispensed to the purchaser by way of a slot 18 (FIGS. 3 & 4) on the customer console 25. Any convenient amount of cash may be utilized for the purchase such as a $20.00 bill even though the sales transaction totals only $18.50. Likewise, the cash and coin acceptors 43, 45 will have the ability, as is known in the art of such acceptors, to distinguish between and identify different denominations of currency and coins as illustrated in FIG. 4.

The console 25 preferably is partially embedded in a concrete base of the service station island and is also preferably physically constructed to resist vandalism and weather. The customer engaging screen 14 of the console 25 is preferably recessed within front wall 59 thereof to protect it from wind and rain and to facilitate its visibility to a purchaser. Moreover, the console 25 and fuel island will be suitably covered with a protective roof 16 to further insure minimum weather damage to the unit. All interconnecting transmission lines such as copper wires, fiber optic cables or the like 18 which may make up part of the LAN 37 may be sealed in a protective conduit and buried in concrete extending from the console 25 to the separate closed facility 29 and to all dispensers 35. As illustrated in FIG. 3, the customer console 25 may also be incorporated into an additional product vending station 26 disposed on the service station islands in proximity to the fuel dispensers 35 at which the purchaser may purchase drinks, snacks, personal items, etc.

The various components of the present system are of a conventional nature, but have been combined to provide the unique combination set forth herein. For example, an appropriate facility server 27 may be a Dell PT90 personal computer with 500 megabyte hard drive and 32 megabytes of RAM (random access memory). Larger memory applications may be required dependent upon the member of islands and dispensers served. A suitable interface 31 operable with this type of PC server may include a conventional GPCC manufactured by Progressive International, Inc. A compatible customer interface controller 39 may be a PSI Pieces and Parts PC. A Hess GmbH MCMC Controller Board (TIPS 280) may be used as suitable cash coin controller 41. A suitable coin dispenser 49 suitable for use and the present invention is the Universal Hopper MK11 made by Coin Controller, Ltd., and a suitable currency dispenser 47 may be the Model 13234 banknote dispenser made by DeLaRu Ltd.

Other additional acceptable components for the present invention include a credit card reader 51 may include a Model No. MT 215232 made by Magtee Corporation, while suitable receipt printer 55 for use with the present invention may be the Model FTP 421 (WMCR 512) Printer by Fugitsu. Any number of suitable units for video display 57, for example Potronix, model 2400, are available and the PIN pad 53 may be of the type utilized by banks in automatic teller machines such as by Atalla. Numerous alternative components for each of the operational functions are currently available and can be utilized in the present inventive concept.

A Second Embodiment of the Invention

Overall System Details

Figure 7:
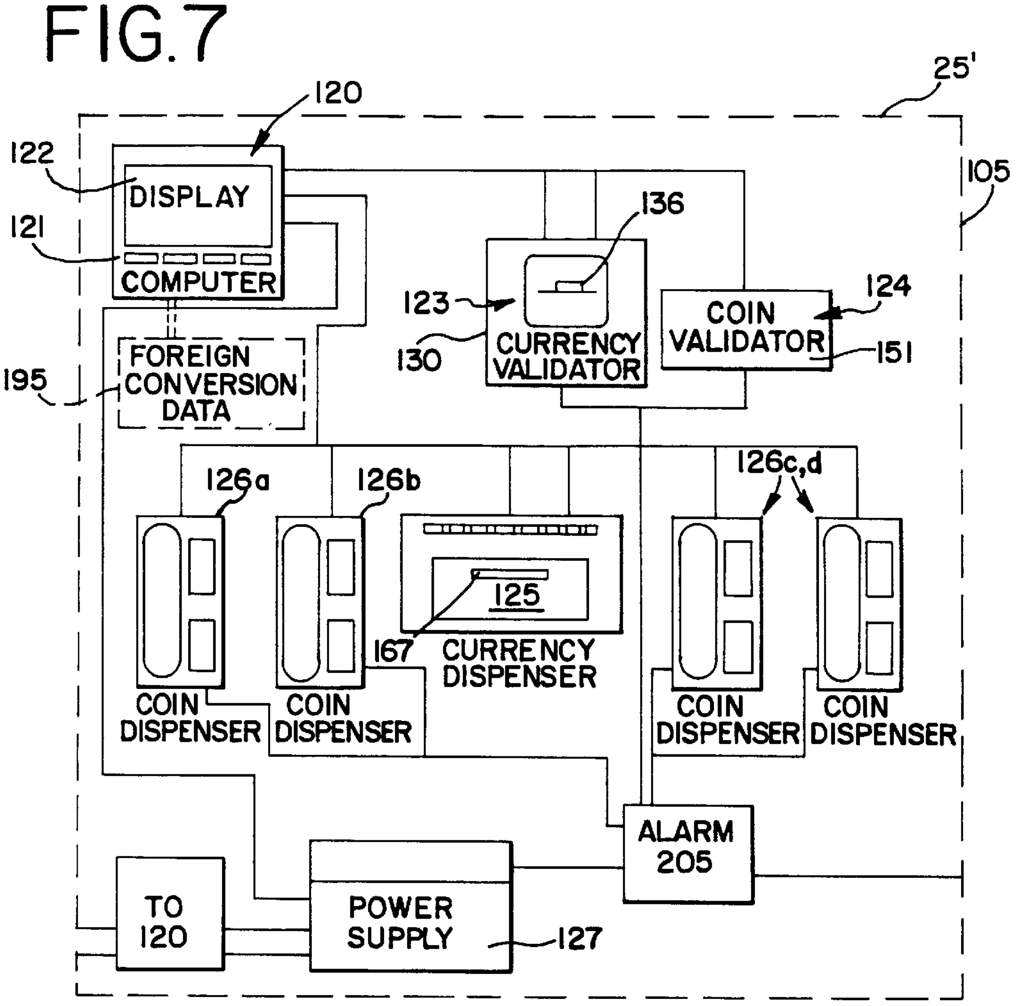
FIG. 7 is a functional block diagram of the cash acceptance and change dispensing means utilized in a second embodiment of a system according to the present invention.
Figure 14:
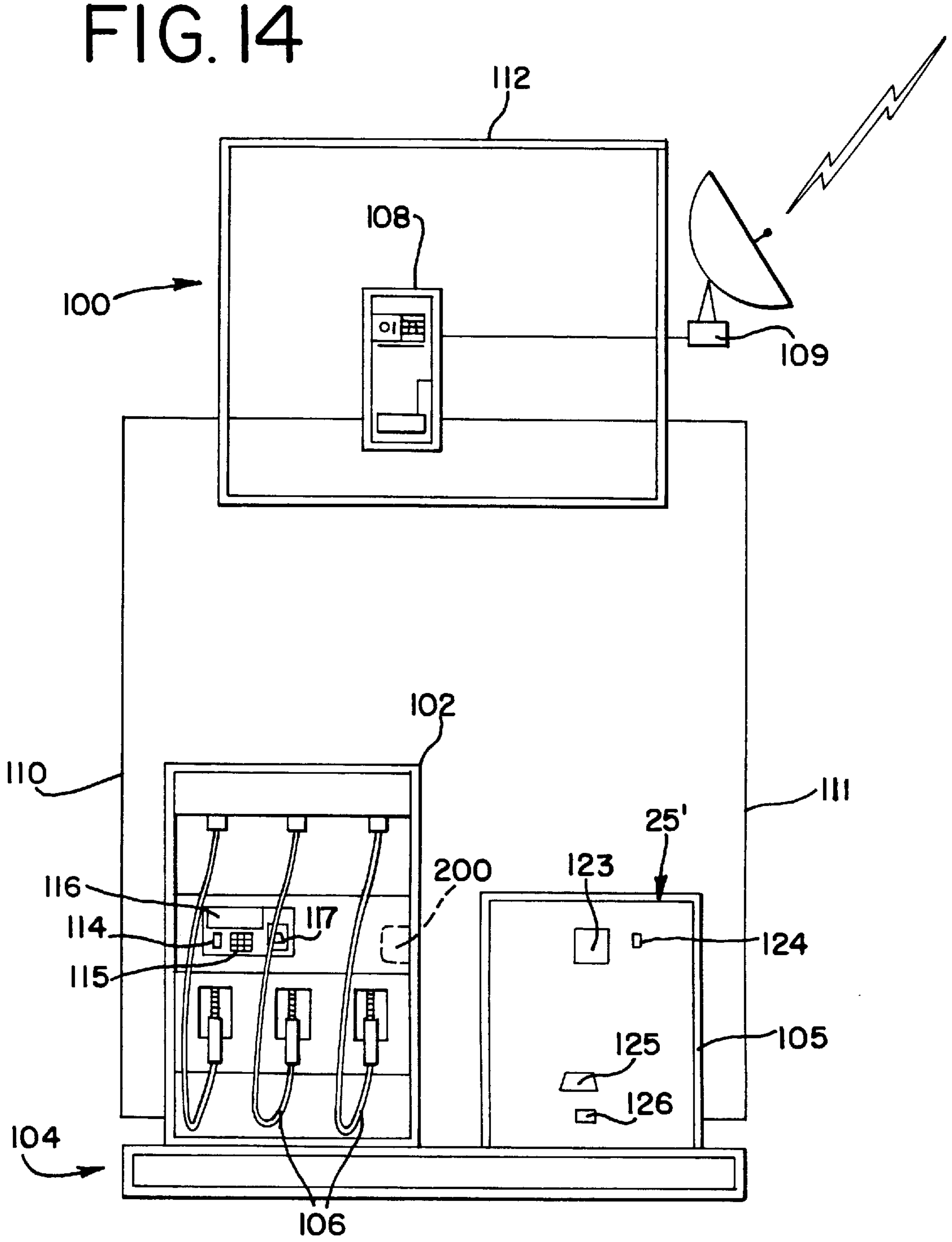
FIG. 14 is a schematic view of an second embodiment of a motor fuel service station incorporating an unattended selling and dispensing system constructed in accordance with the principles of the present invention showing the interconnection of the control computer, the fueling dispensers and the cash acceptance and change dispensing components of FIG. 7.
Figure 18:
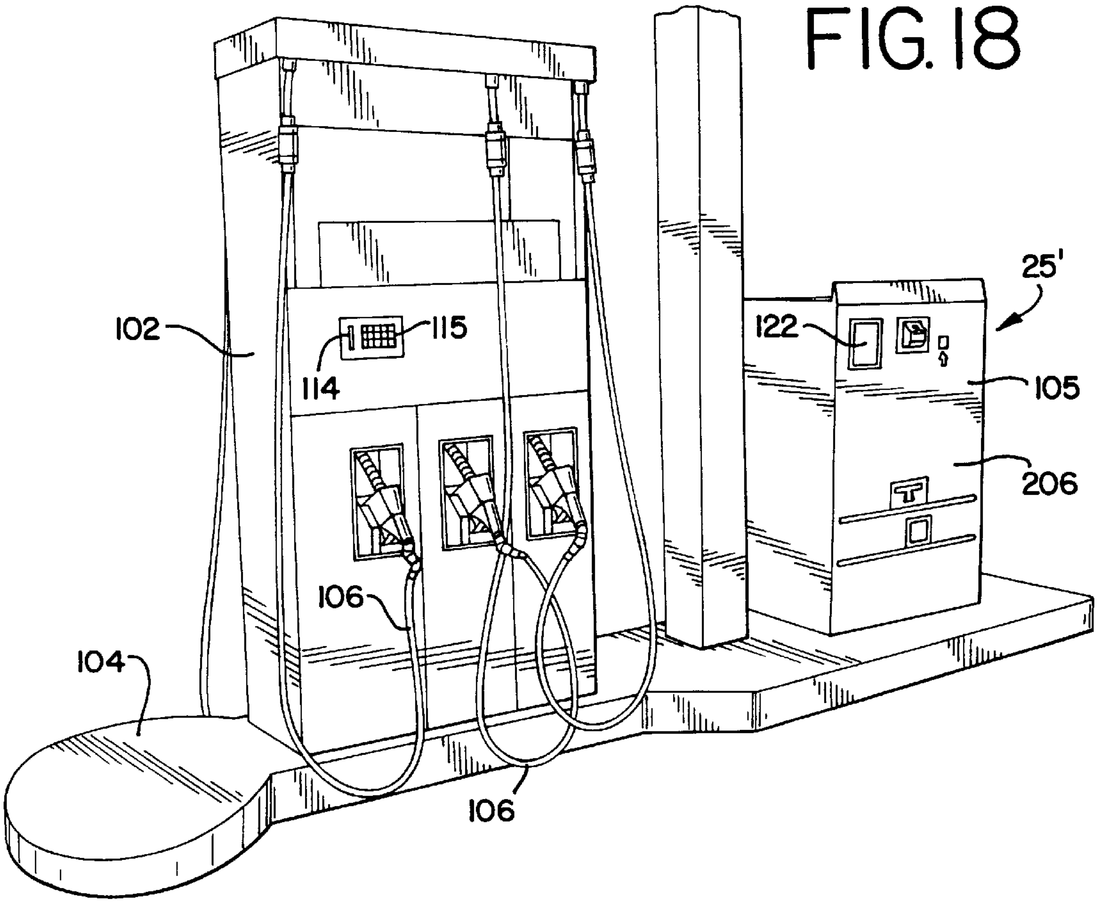
FIG. 18 is a perspective view of an unattended service station incorporating the second embodiment of the invention.

Another embodiment of a system 100 for unattended automated dispensing of motor fuels constructed in accordance with the principles of the present invention is depicted in FIGS. 7, 14 and 18. FIG. 14 is a schematic diagram of the overall system 100 of the present invention which permits the operation of an unattended service station, while FIG. 7 is a functional block diagram which illustrates the various components which are housed within a customer cash console 25' of the present invention which in effect, operates as a "vending machine" for motor fuel.

In the system 100 of the invention, one or more fuel pumps 102 are located on a fueling island 104 associated with a secure control building 112, which combined comprise the service station. A system controller 108 is located in the control building 112 and interconnects the pump 102 and customer cash console 25' together. The pump 102 contains one or more individual fueling nozzles 106 which typically correspond to different grades of motor fuel offered for sale at the station. The nozzles 106 may be arranged back-to-back on opposite sides of the pump 102 so that the pump will control two distinct sets of nozzles 106. In this instance, two customer consoles 25' will be housed in the protective housing 105 on like opposite sides. A customer cash console, or vending machine 25' is located on the island 104 either enclosed within a protective housing 105 or incorporated with in the fuel pump 102, in order to provide the island 104 and its associated fuel pump 102 with the capability of accepting cash as payment for purchase of motor fuel and of dispensing cash as change for the purchase.

The pump 102 may be a conventional motor fuel pump having a plurality of nozzles 106. In this embodiment, the pump 102 has a credit card reader incorporated therein that includes a credit card slot 114 with an internal magnetic stripe reader (not shown), a numerical keypad 115 for entering personal identification numbers (PINs) used with credit or debit cards. The pump 102 may also include a visual display 116 for displaying information in the form of prompts to the purchaser and a receipt printer 117.

The console 25' has its own controller 120 in the form of a central processing unit 121 linked to a visual display screen 122 upon which various messages and commands may be usually displayed to the purchaser. Both the pump 102 and the console 25' are interconnected, by communication links 110, 111 shown, to an overall system controller 108 in the form of a computer, such as a PC or other computer, that is located within a facility building 112. The controller 108 is capable of two-way communication with both the pump 102 and the console 25' and is further capable of offsite communication via suitable means 109. The system controller 108 may also take the form of a point-of-sale device at a manned service station to permit a station employee at the point-of-sale to monitor cash and credit transactions occurring at the fuel pump 102.

The console controller CPU 121 may utilize an embedded panel PC such as a MiPC486M panel PC made by Advantech, which has a flat panel display incorporated therein with a single board computer that takes up a minimum of space, thus permitting efficient back-to-back mounting of two consoles 25' within the console housing 105.

Customer Cash Console

The console controller 120 is operatively linked to cash acceptance means comprising a currency acceptance means 123 and a coin acceptance means 124. These two cash acceptance means 123, 124, as explained in greater detail below, receive and validate cash inserted by a purchaser in order to inform the pump 102 of the total money deposited by the purchaser so that the pump 102 will set a limit on the total amount of fuel to be dispensed in the transaction.

The cash console controller 120 is also operatively connected to change dispensing means 125, 126 which includes a currency dispensing and a bank of coin dispensing means 126. The change dispensing means 125, 126 are used to dispense an appropriate amount of change to a customer upon receipt of a change due signal from the console controller 120 after an approval signal is received from the system controller 108. The components which make up the cash console 25', such as the cash acceptance means 123, 124, the change dispensing means 125, 126 and the console controller 120 are powered by a power supply 127 located within the housing 105.

Currency Acceptance Means

Figure 8:
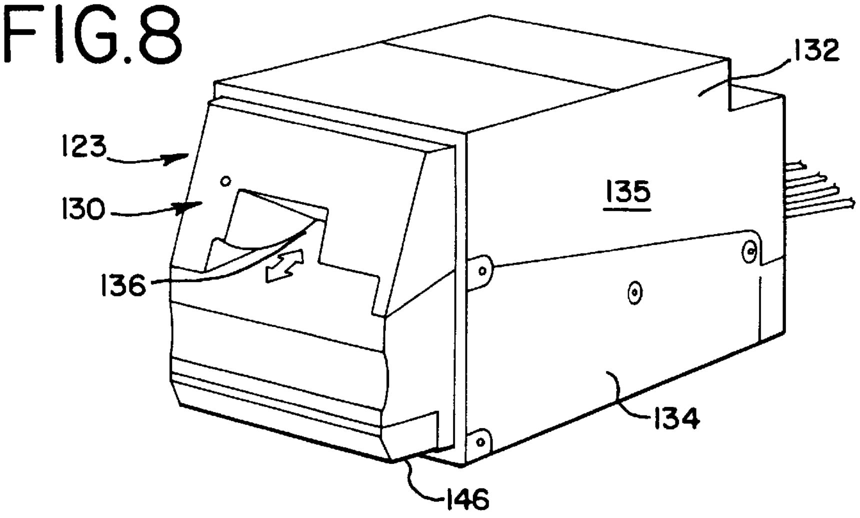
FIG. 8 is a perspective view of a currency validator used as a currency acceptance means in the system of FIG. 7.

Turning now specifically to FIG. 8, a banknote validator 130 is illustrated which may be used as a currency acceptance means 123 in accordance with the principles of the invention. The validator 130 shown in a BNA 50 banknote validator available from the Mars Electronics International division of SODECO Cash Management Systems. The validator 130 includes a durable metal housing 132 having two interconnecting portions 134, 135 hinged together for access to the interior. The validator 130 has a single slot 136 into which a purchaser may insert various denomination of currency.

Figure 8A:
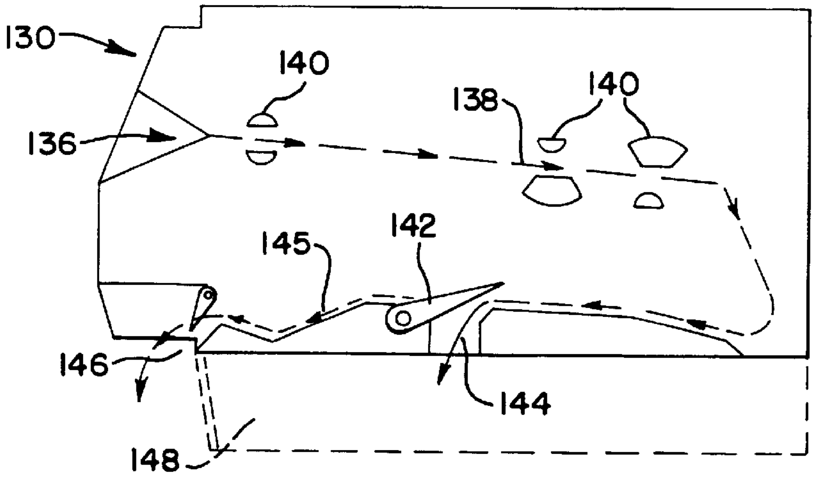
FIG. 8A is a schematic cross-sectional view of the currency validator of FIG. 8.

As seen in FIG. 8A, one or more banknote sensors 140, such as optical sensors, are located along a banknote travel path 138 within the validator 130. These sensors are positioned to scan different aspects, or portions, of each banknote inserted into the validator 130. The validator 130 is equipped with a suitable banknote diversion means, such as a movable gate 142 interposed in the banknote travel path 138 which is actuatable upon command from an internal acceptance controller (not shown) which compares the information received from the sensors 140 with standardized information held within a memory location. A plurality of sensors 140 may be utilized so that the system is capable of accepting banknotes in any orientation, i.e. face up, face down or the like. When the banknote inserted does not match any banknote information held in the validator's memory, such as when the banknote is extremely worn or ragged, a signal is sent to the gate 142 to close off the normal exit 144 of the validator 130 and direct the banknote along a return path 145 where it is returned to the purchaser through a return slot 146. When the comparison is favorable and the banknote is validated, the gate 142 directs the banknote to an exit 144 leading to a removable vault 148 which may be emptied periodically by a serviceman.

The banknote patterns which are programmed into the validator's memory are referred to as "variants". These variants are identified in the memory of the validator 130 by a four-digit code. The validator transmits this four-digit code to the console controller 120 upon matching a variant and the console controller then compares the code to a list of denominations contained in the controller memory. The controller 120 thereupon sends a signal to the system controller 108 indicating the value attained at the console 25'. The system controller 108 thereupon sends an enabling signal to the pump 102 permitting it to pump through the nozzle selected by the purchaser an amount of fuel equivalent in cost to the amount of deposited.

Coin Acceptance Means

Figure 11:
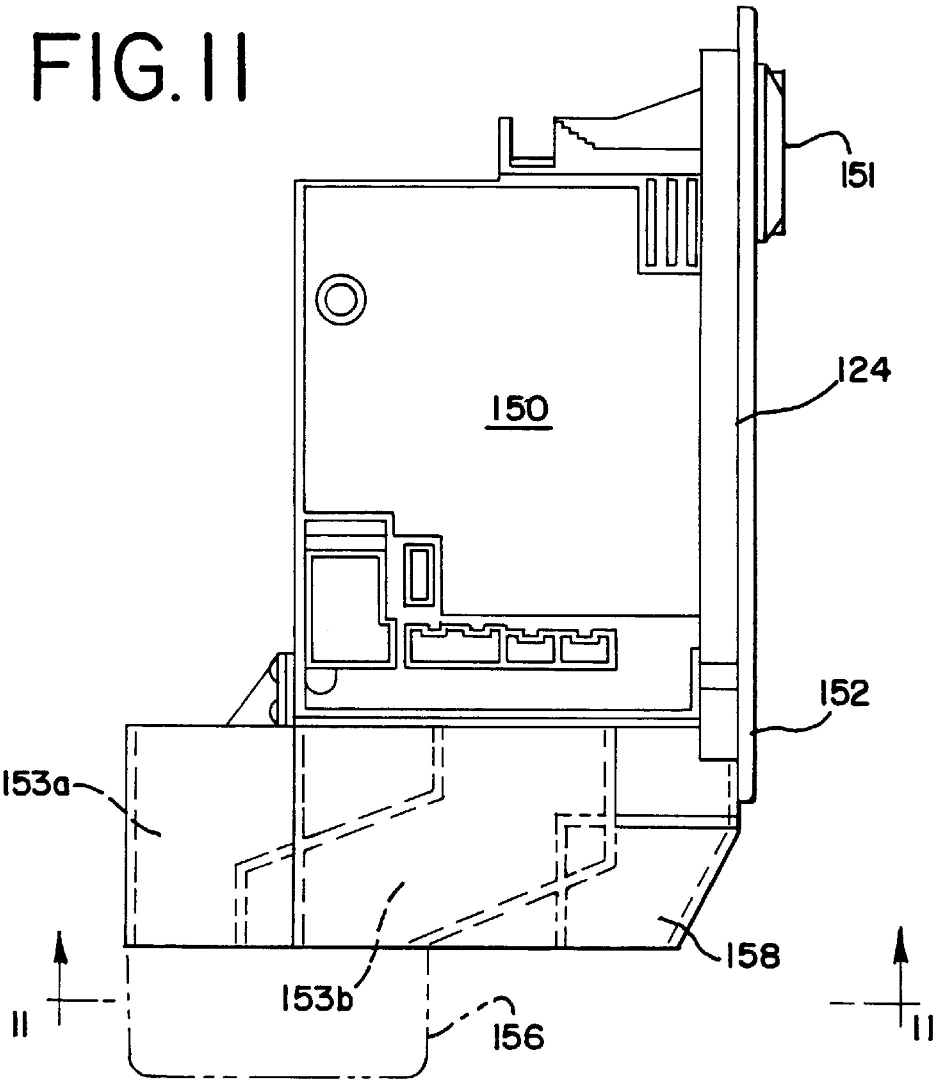
FIG. 11 is an exploded view of a coin validator used as a coin acceptance means in the system of FIG. 7.
Figure 11A:
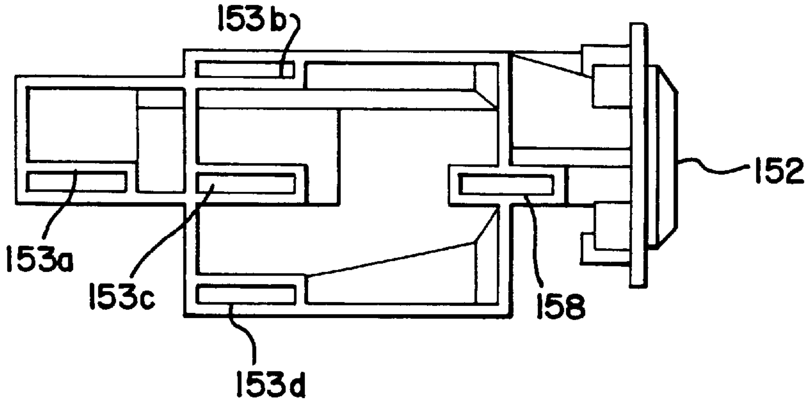
FIG. 11A is a bottom view of the coin validator of FIG. 11, taken along lines 11-A thereof.

A coin acceptance means 124 is also operatively linked to the console controller 120 and operates in a manner similar to the currency acceptance means. FIGS. 11 & 11A illustrate a coin validator 150 suitable for use as a coin acceptance means 124 in the present invention. In this detailed description, the terms "validator" and "validating" refer verifying the identity and value of a coin. The validator 150 illustrated is a C455 Electronic Validator manufactured by Coin Controls International of Oldham, England that can be programmed to accept up to 12 different coins of different preselected monetary systems by receiving and validating coins having diameters ranging from between 15 to 30 mm and thicknesses from between 1 to 3.3 mm. The validator 150 illustrated has a front entry slot 151 into which the purchaser inserts coins as part of his purchase of motor fuel. The coins roll along a travel path past a series of sensors (not shown) which detect various parameters, or characteristics, of acceptable coins such as, for example, size, weight, thickness, visual appearance and metal content. These characteristics are sent to a memory of the validator 150 and are compared to various coin characteristics previously programmed into the memory. When a match is obtained between the two characteristics, an acceptance gate of the validator 150 is actuated and the coin(s) passes through to a coin accept path, where the coin is read by a coin accept sensor.

Once the coin accept sensor reads the validated coin, a credit signal is generated and transmitted to the console controller which calculates the value of the coin(s) as well as calculates a running total of the cash deposited by the customer in both the currency and cash acceptance means 123, 124. In instances where the coin does not match any of the preprogrammed parameters, the accept gate of the validator 150 remains closed and the coin is then shunted along a reject path where it may either be returned directly to the purchaser through a reject slot 152 when the rejection is based upon wear or dirt, or into a reject hopper when the rejection detects a slug or the like.

The coin validator 150 not only identifies a coin and its value when inserted therein, but it also sorts the coins by directing them along discrete coin paths or ramps 153*a*–153*d*, defined within a manifold 154 disposed underneath the validator 150 illustrated. The first two of the coin ramps 153*a*, 153*b* lead to a recycle area 155 (explained in greater detail below) where the coins are recycled by the cash console 25' for use as change in subsequent purchases. Other of the coin ramps 153*c*, 153*d* may lead to one or more coin accumulation vaults 156 of the cash console 25' which may be retrieved at periodic intervals by a serviceman. Still another coin ramp may serve as an indirect coin reject ramp 158 for coins which are rejected for purchase, but retained by the validator 150.

Figure 12:
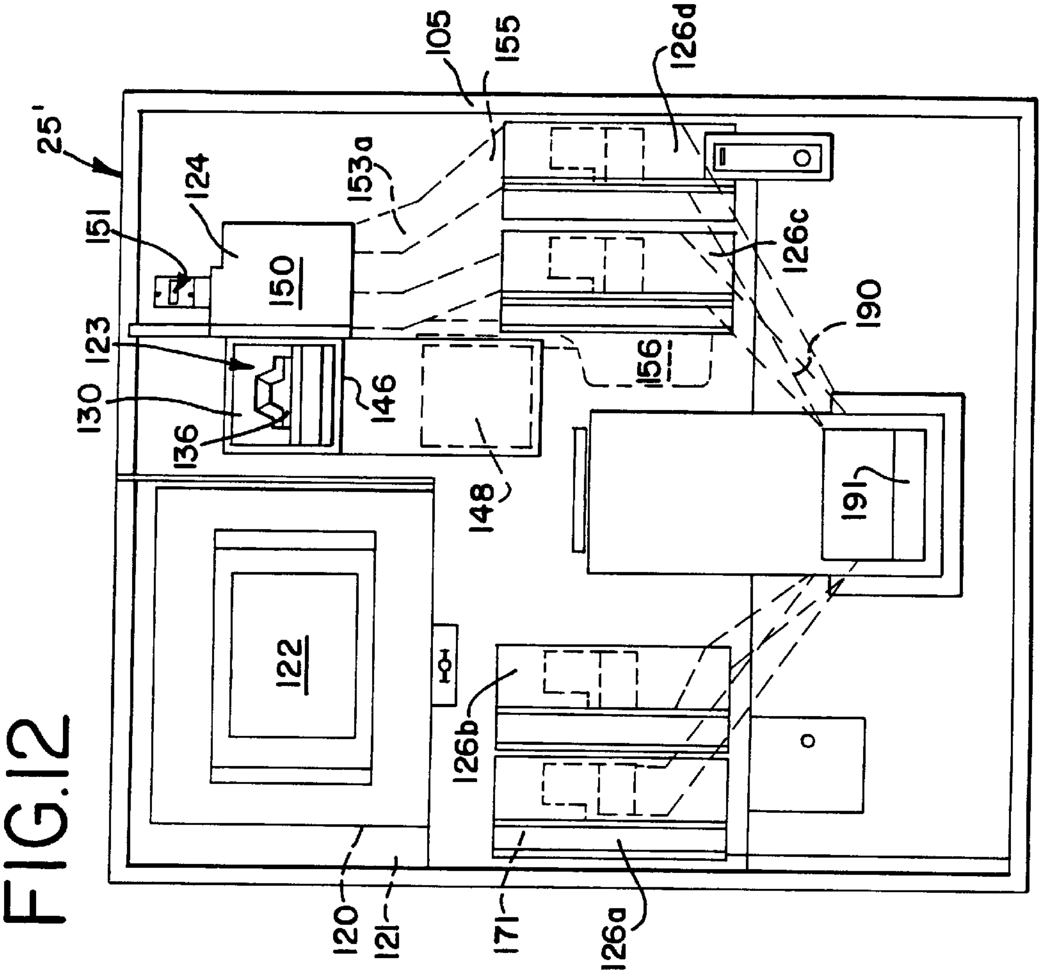
FIG. 12 is a elevational view of the customer console which houses the components illustrated in FIG. 7.

Two of the coin ramps 153*a*, 153*b* lead to two of the coin dispensing means 126*c*, 126*d* as explained in greater detail below. The coin validator 150 has an internal sorter so that preselected coins, in this instance 5-cent and 25-cent pieces are ramped back to supply cashboxes 171 of the coin dispensers of the cash console 25', while other coins, such as 10-cent and large denomination coins, such as 50-cent and dollar coins, are ramped to the coin vault 156. As seen in FIG. 12, the coin validator 150 is therefore preferably positioned within the cash console 25' at an elevation greater than that of the coin dispensers to advantageously utilize gravity to assist in the recycling of the desired coins. Although the embodiment illustrated depicts only two coin recycling ramps, it will be understood that as many recycle ramps as there are coin dispensers within the cash console 25' may be used subject only to space limitations within the housing 105 of the cash console 25'. The coin validator 150 may be programmed not to accept very small denomination coins, such as 1-cent coins, because the pump 102 is virtually incapable of dispensing fuel in quantities equivalent in cost to 1 cent.

Currency Dispensing Means

Figure 10A:
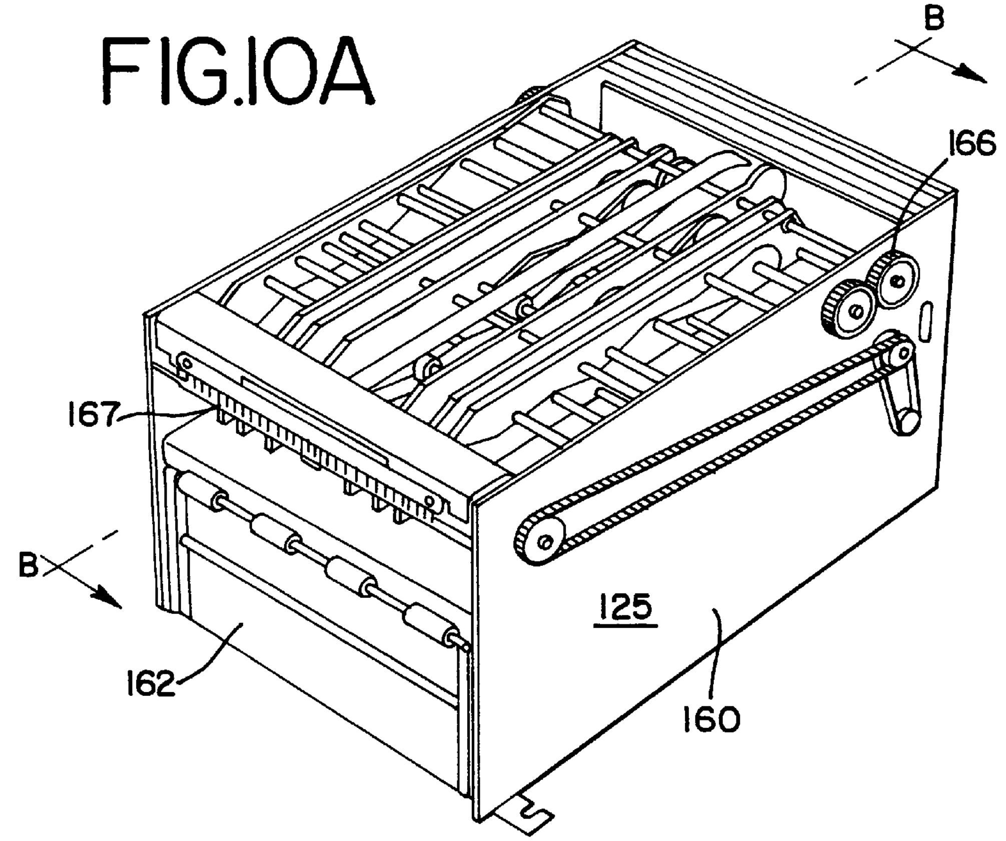
FIG. 10A is a exploded perspective view of a currency dispenser used in the system of FIG. 7.
Figure 10B:
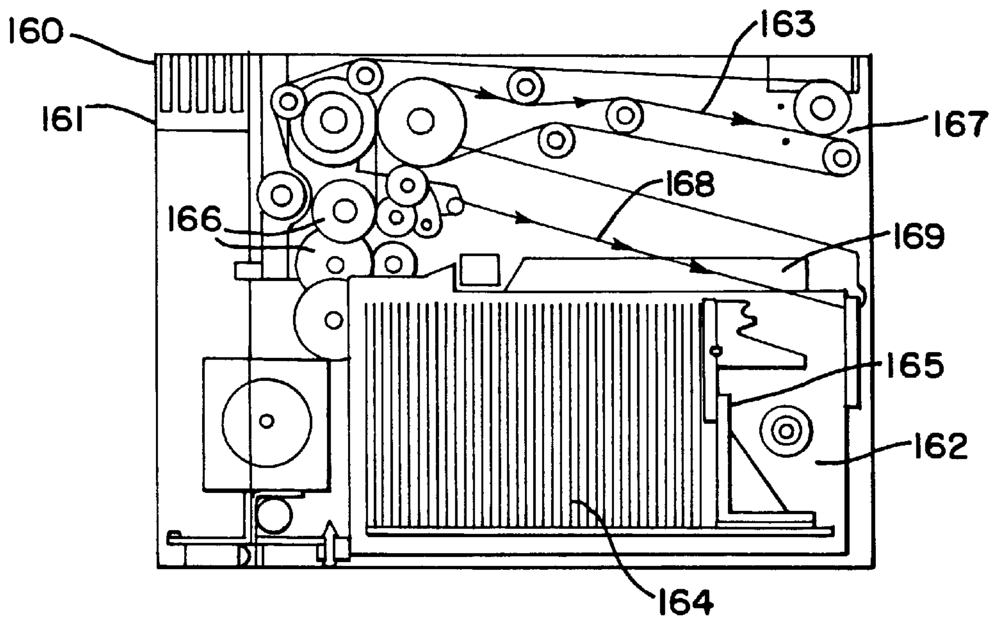
FIG. 10B is a cross-sectional view of the coin dispenser of FIG. 10A taken along lines B—B thereof.

FIGS. 10A & 10B illustrate a currency dispensing means 125 used with the present invention in the form of a currency dispenser 160. The currency dispenser 160 illustrated is a DeLaRue 1701 short Single Denomination Dispenser (SDD) manufactured by DeLaRue of Hants, England and includes a secure and durable housing 161, a removable cassette 162 in the form of a box that contains a supply 164 of specific denomination banknotes arranged upright within the cassette 162. The dispenser 160 includes a means for applying pressure to the banknotes in the form of a packer plate 165 which applies a predetermined amount of pressure to the banknote supply 164 in order to advance the leading banknote of the supply into contact with one or more dispensing drive wheels 166 which convey the banknote(s) along a banknote drive path 163 out through a dispensing slot 167 of the dispenser 160. In the event that a banknote becomes torn or crumpled to an extent where it may jam or otherwise catch in the drive mechanism 166, the dispenser 160 includes one or more sensors to detect such a condition when detected, the banknote is routed along a reject path 168 where it is returned to a reject tray 169 for removal.

In that only one currency dispenser is illustrated in the described embodiments, the dispenser 160 contains a supply of lowest denomination banknotes for the local currency, such as 1-dollar banknotes. In order to prevent premature depletion of the banknote change supply, as explained above, the currency validator 130 may be programmed not to accept large denomination banknotes, such as 50- and 100-dollar banknotes. Additional currency dispensers of different denomination banknotes may be incorporated into the cash console 25' to give the console 25' the ability to accept such large denominations and dispense change in the form of multiple banknotes of different denominations.

Coin Dispensing Means

Figure 9:
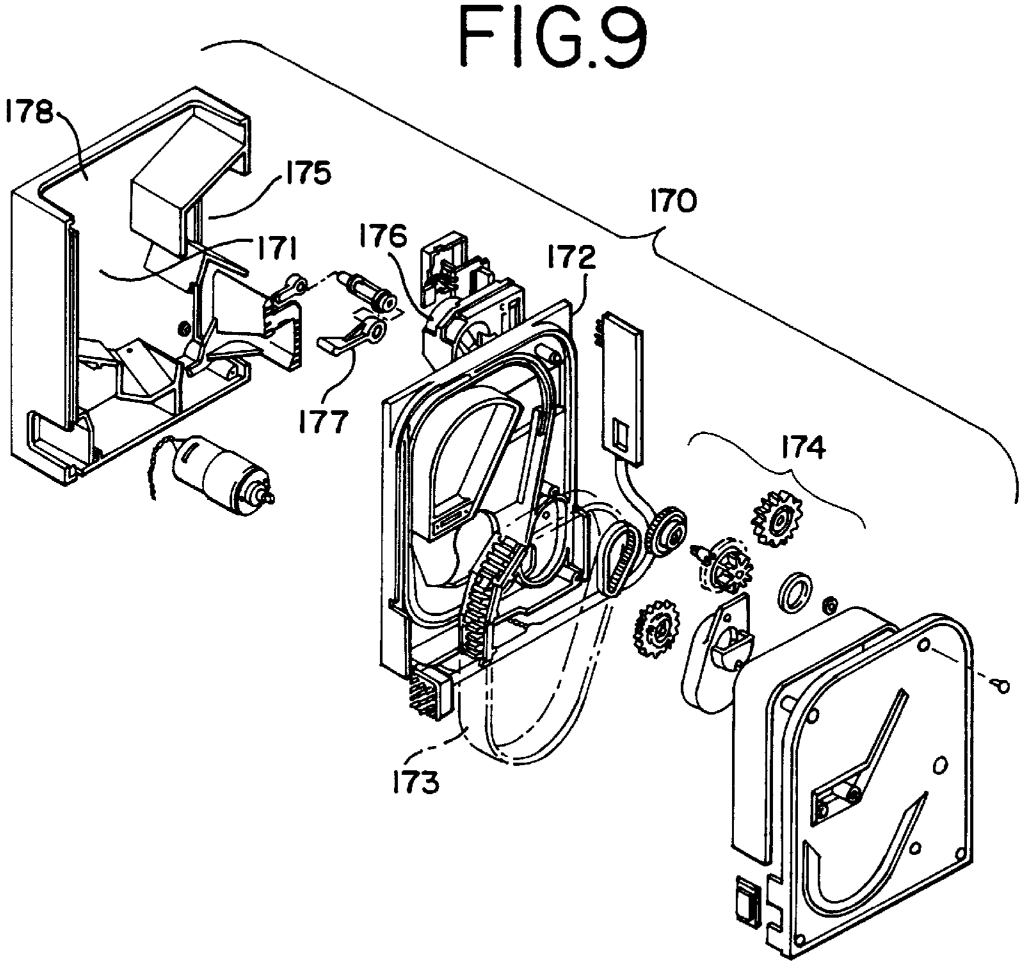
FIG. 9 is an exploded perspective view of a coin control hopper used in the system of FIG. 7.

FIG. 9 illustrates a coin dispenser 170 which is used in the present invention as part of the coin dispensing means 126 of the cash console 25' that dispenses change to a purchaser as part of a motor fuel purchase. The dispenser is a Coin Controls International Universal Hopper Mark III which contains a supply of between 800 to 1600 coins depending on the diameters and thicknesses of the coins. The smaller the diameter and thickness, the closer the coin storage amount will be to the 1600 coin level and vice-versa. The dispenser 170 dispenses coins as change upon a command signal from the console controller 120 at a rate of approximately 3 coins per second.

The dispenser 170 includes a cashbox section 171 mounted aside a center plate 172 that supports a segmented drive belt 173 which is driven by a gear assembly 174. The belt 173 picks up coins from the bottom of the cashbox 171 and transfers them to an exit window 175 where their presence is sensed by optional sensors 176. The sensors 176 send a signal indicative of the number of coins passing through the exit window to the cash console controller 120 to confirm the exact payment totals of change given back to the purchaser. An agitation assembly 177 is preferably provided in association with the cashbox in order to ensure that a smooth flow of coins results onto the drive belt 173.

Figure 13:
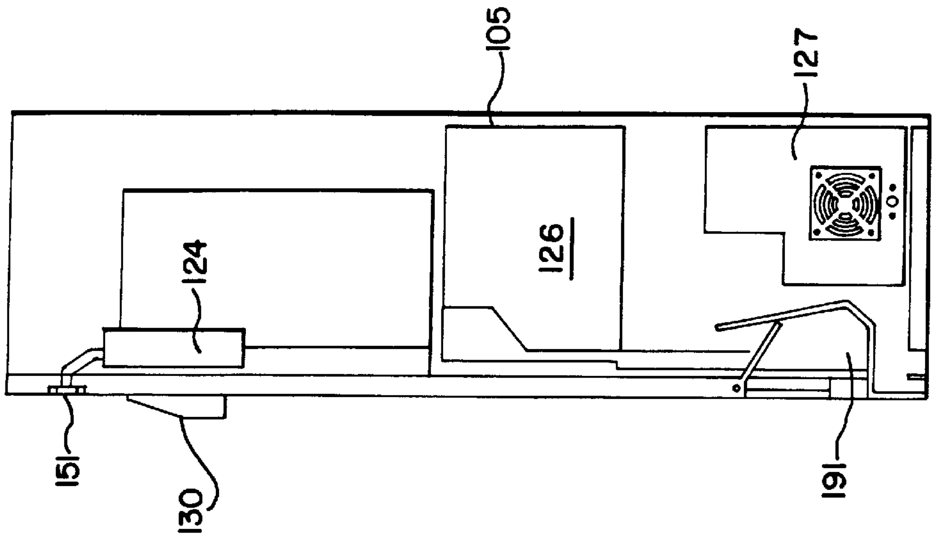
FIG. 13 is an end sectional view of the system of FIG. 9.

The upper portion 178 of the coin dispenser 170 is open in the embodiment shown and it communicates with a particular coin ramp of the coin validator 150 in instances where the specific coins are to be recycled, such as for 5-cent and 25-cent pieces, as explained above. These type coins, when taken in by the coin validator 150 may be directed immediately to a recycle area, namely, the cashbox 171 of a specific dispenser 170. Four such coin dispensers 126*a*, 126*b*, 126*c* & 126*d* are shown in the cash console of FIGS. 12 & 13 which will be the preferred arrangement for utilization in the United States in that the four dispensers 170 may accommodate and dispense 1-cent, 5-cent, 10-cent and 25-cent pieces as change. In this preferred embodiment, the choice of recycling of coins is made for the 5-cent and 25-cent pieces because their respective diameters and thicknesses bring the storage amount of their respective dispenser cashboxes 171 down to near their 800 coin amounts.

System Control Means

The system controller 108 coordinates the operation of the pump 102 and the console 25' by operatively linking the two together and importantly providing an enabling/disabling function for the two system components so that a credit purchase cannot be made simultaneously with a cash purchase at the same pump and vice-versa.

Figure 15A:
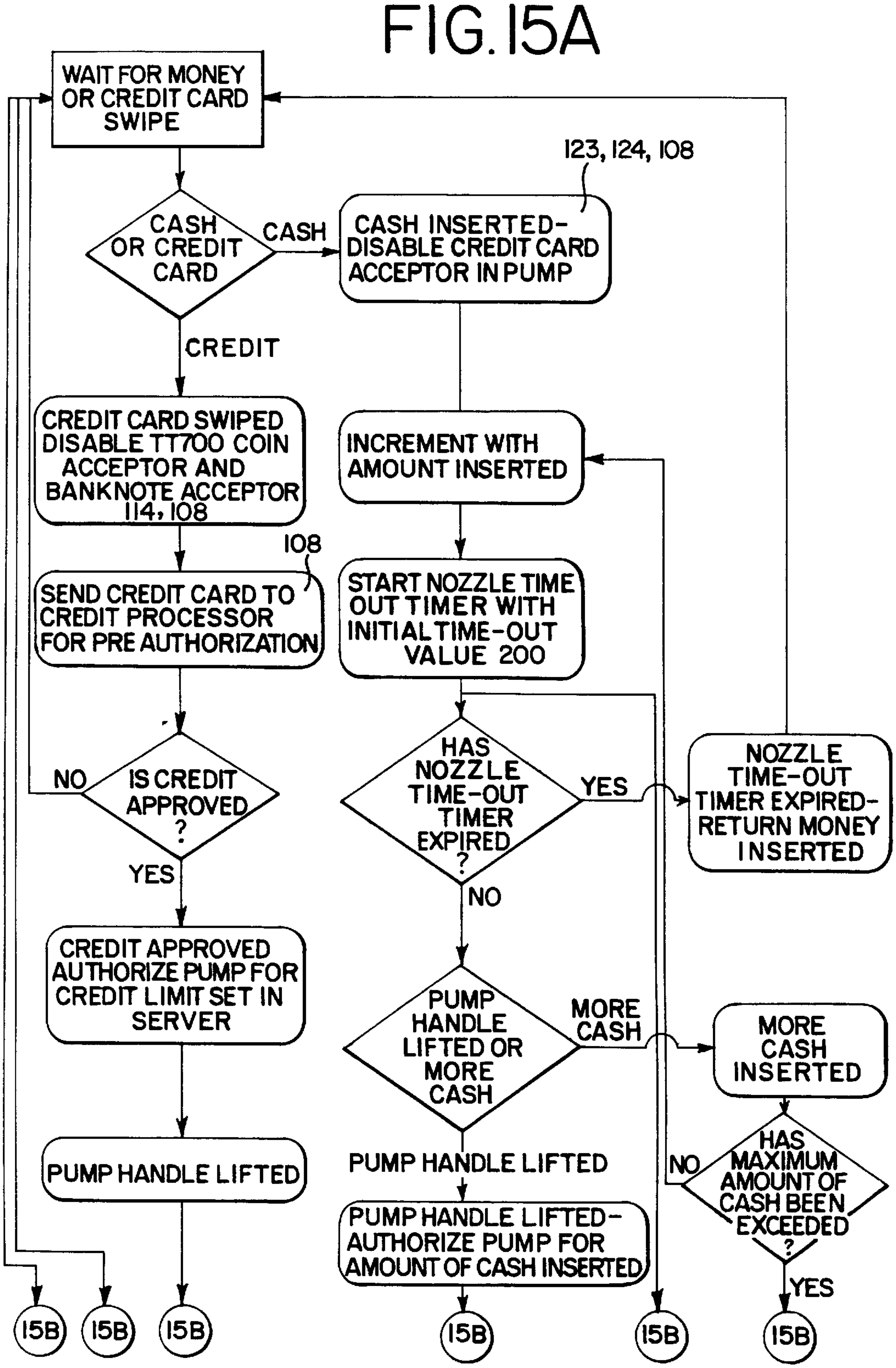
FIGS. 15A & 15B, combined, are a flow chart illustrating the control sequence executed by the components of the system depicted in FIG. 14.
Figure 15B:
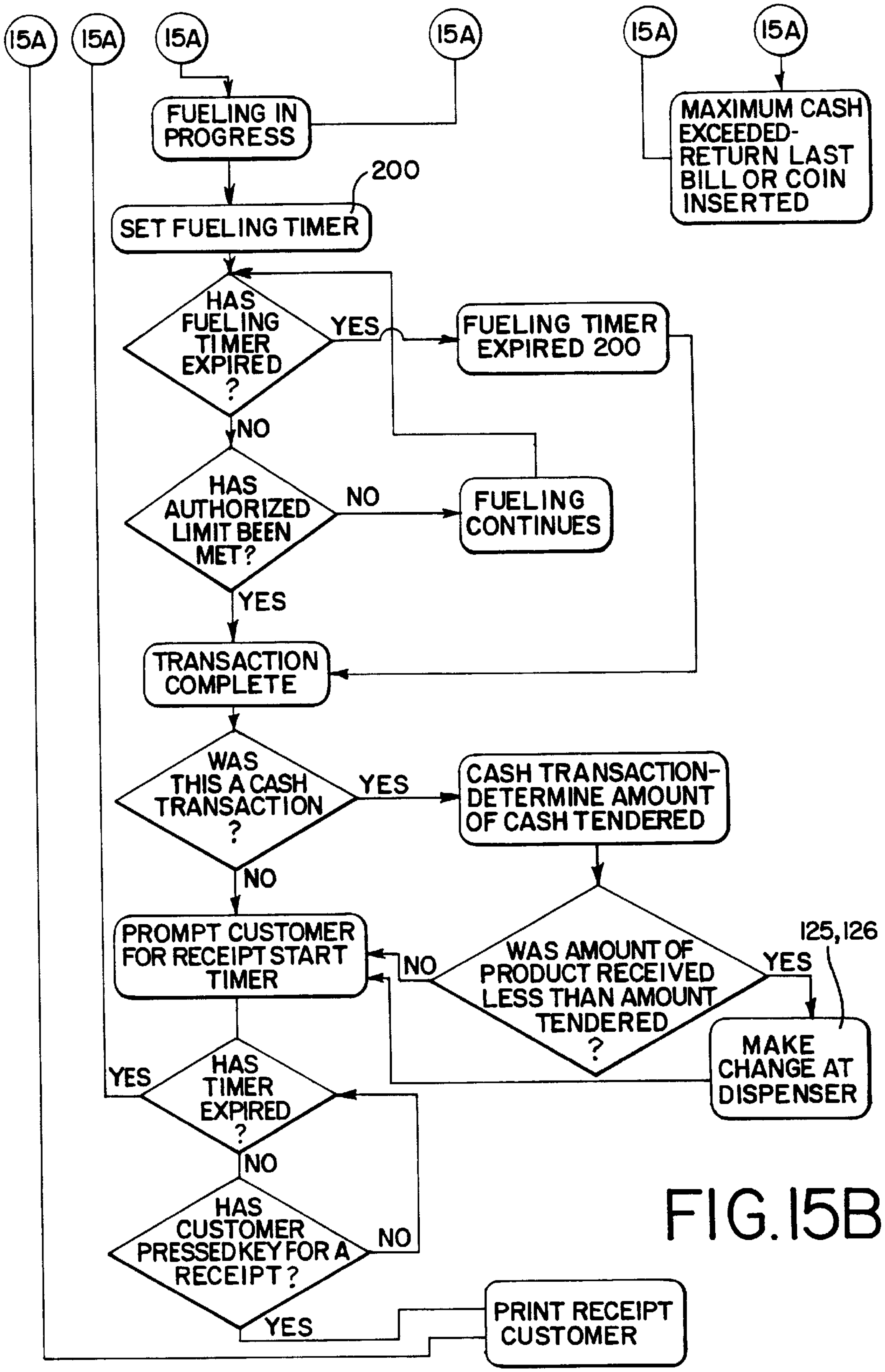

FIGS. 15A & 15B, combined, are a simplified flow diagram illustrating the disabling function. The system sits in a state of readiness during which time the system controller 108 constantly "polls" the pump 102 and cash console 25' via signal communication via links 110, 111 until a purchaser approaches and inserts either cash into the console 25' or a credit or debit card into the card reader 114 of the pump 102, actions that change the status of the pump 102 and console 25'. (FIG. 16) In the case of a credit card as shown in FIGS. 17 & 17A, the pump 102 sends a signal to the system controller 108 that a credit card has been inserted into the pump 102 and the system controller 108 thereupon disables the cash console 25' by sending the console controller 120 a signal not to accept any cash. The system controller 108 then reads the card number and PIN, if any is entered by the purchaser, and sends it offsite to a credit card authorization and verification station by way of a satellite uplink 109 or other suitable transmission means such as a modem or fiber-optic cable network.

Similarly, in a cash purchase, when a purchaser inserts cash into the cash console 25', it sends a signal back to the system controller 108 to inform it of the cash transaction and the controller 108 thereupon sends a disabling signal to the pump card reader 114. (FIGS. 15A & 15B.) Incorporated into the system 100 is a timing means, such as fueling timer 200 integrated in the fuel pump 102 that is started by an enablement signal sent by the system controller 108. This timer permits the pump from staying in an "on" position for extended periods of time where no further activity is sensed at the pump 102 or the cash console 25' by the system controller 108.

Figure 16:
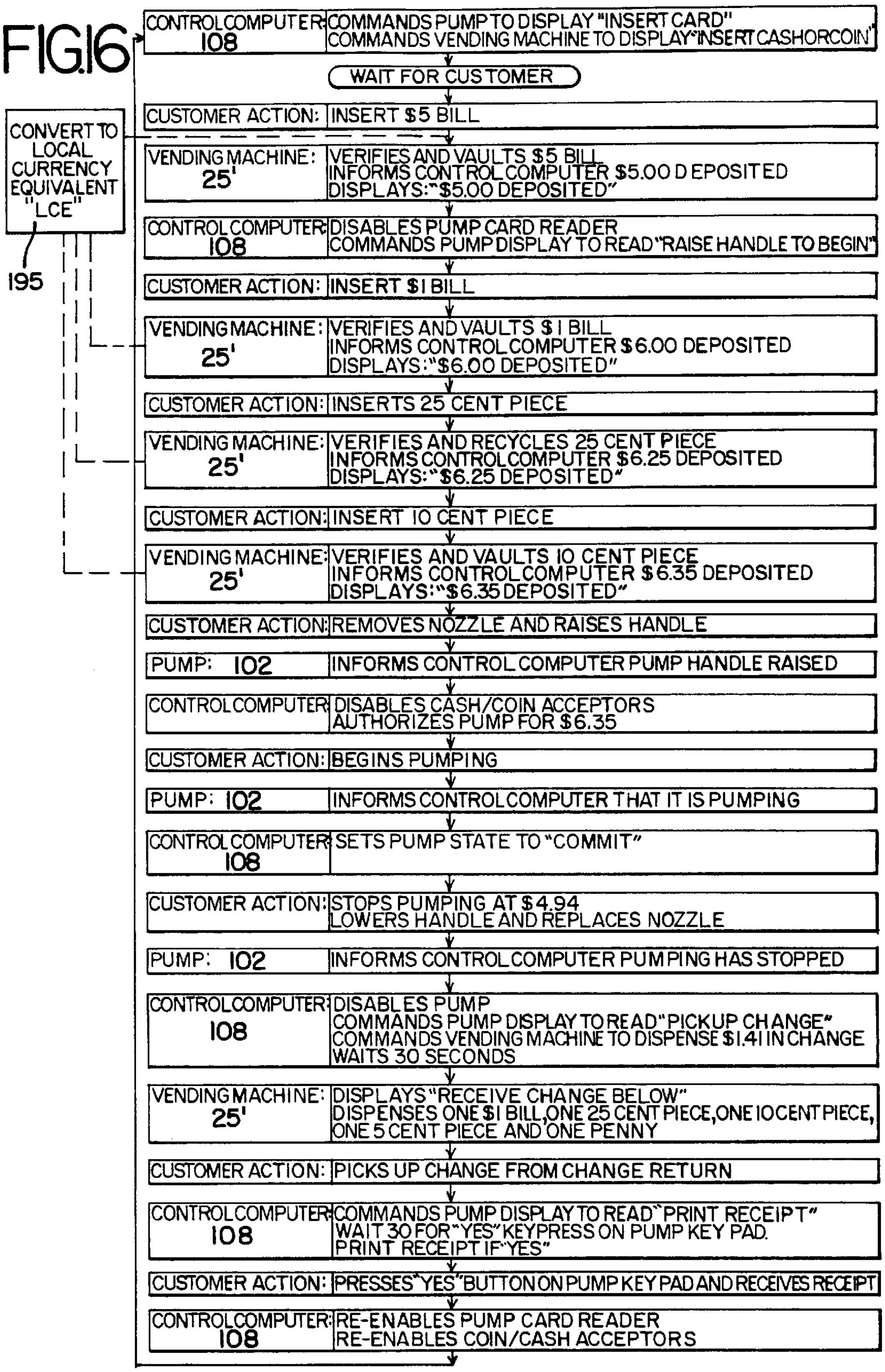
FIG. 16 is a flow chart illustrating the sequence of events and commands which occur in the use of the system of FIG. 7 and specifically illustrating the operation of the system for a cash transaction.
Figure 17:
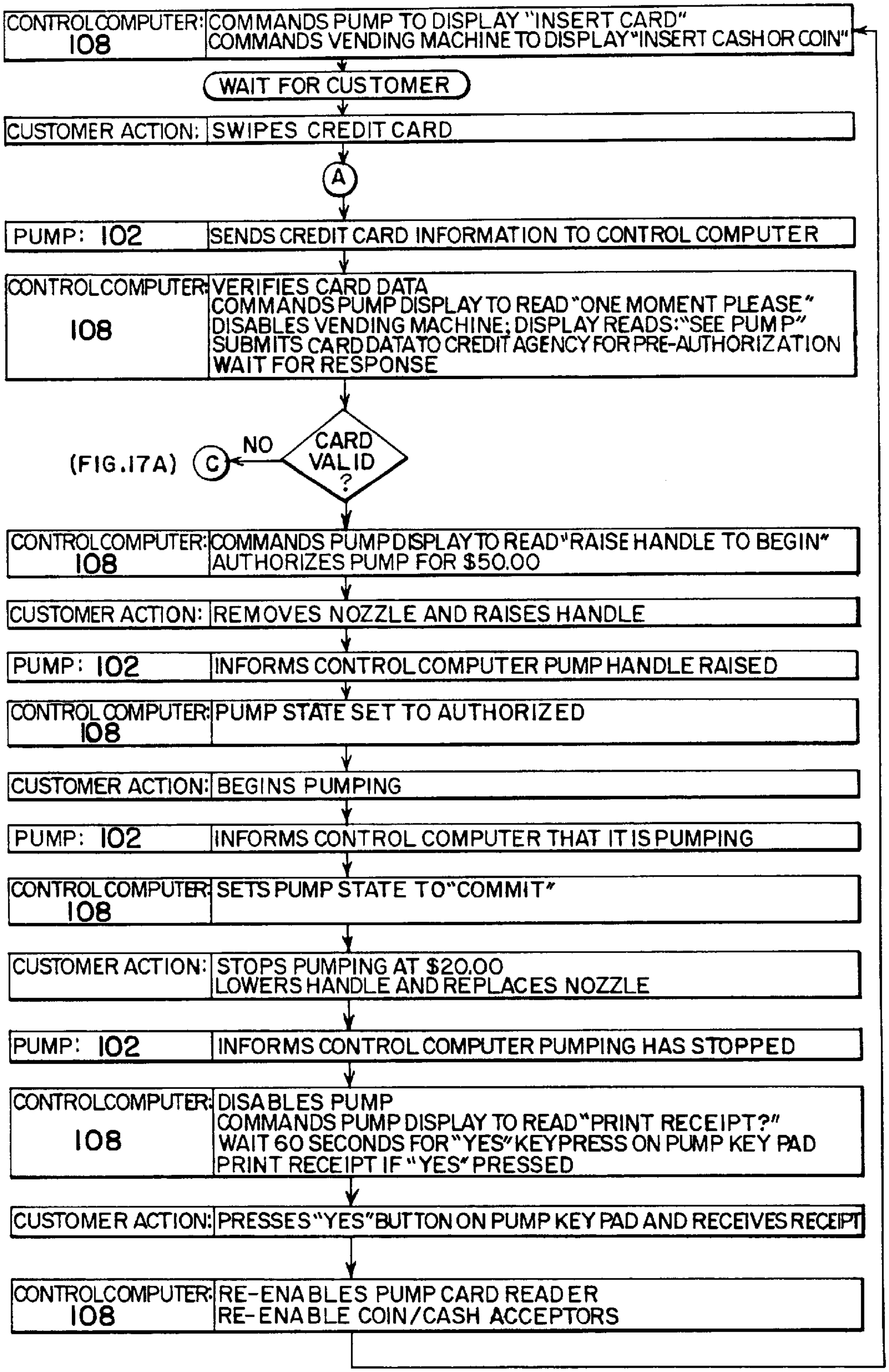
FIGS. 17 and 17A, combined, are a flow chart illustrating the sequence of events and commands which occur in the use of the system of FIG. 7 and specifically illustrating the operation of the system for a credit transaction.
Figure 17A:
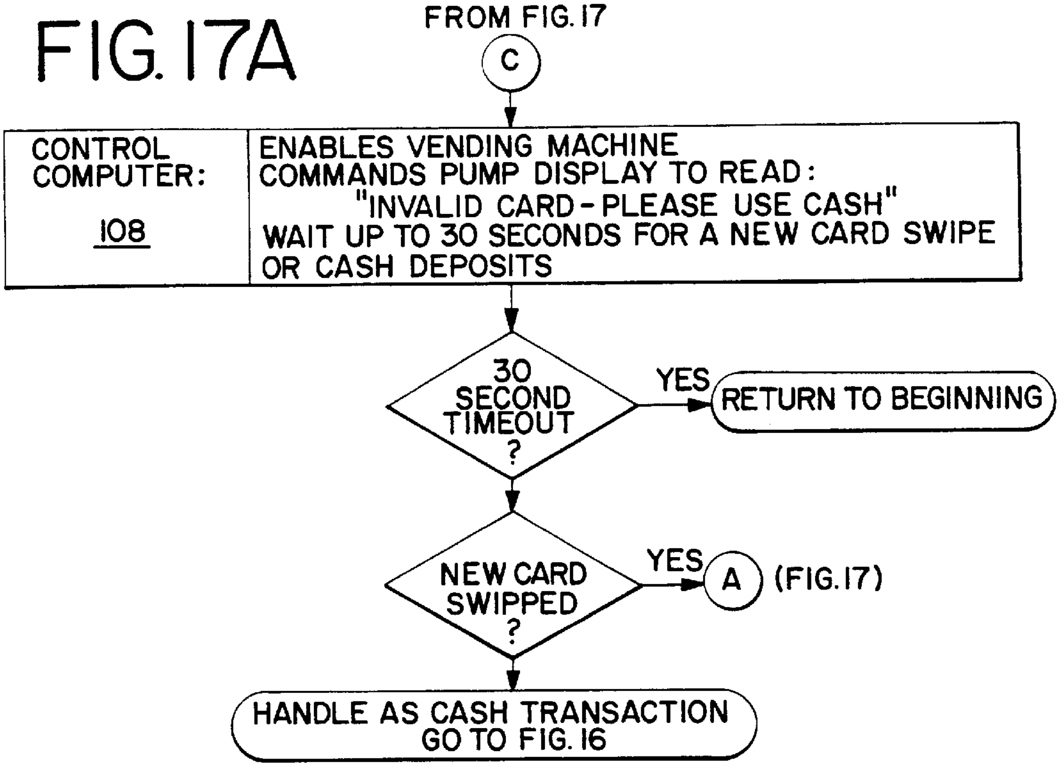

Turning now to FIG. 16, a flow chart is illustrated which sets forth, in simplified fashion, the steps taken by the purchaser, the commands issued by the system controller 108 and also the actions taken by the pump 102 and cash console 25' in a cash transaction. As seen from FIG. 16, the system controller or control computer disables the pump 102 when cash is deposited into the cash console, or vending machine 25'. As more money is deposited, a running total is calculated by the control console 25' and the running total is transmitted back to the system controller 108. When either the fuel nozzle has been replaced or the nozzle timer has expired, the system controller 108 disables the pump 102 and in instances where the purchaser has pumped a quantity of motor fuel at a cost less than the money deposited, the cash console 25' is instructed by the system controller 108 to dispense an appropriate amount of change ($1.41 in FIG. 16).

In dispensing the change, the cash console 25' instructs the currency and change dispensing means 125, 126 to dispense an appropriate amount of change back to the purchaser. In this regard, each coin dispenser 170 receives a discrete signal from the console controller 25'. Upon receipt of these signals, the selected coins will be dispensed into a chute 190 leading to a change drawer 191 of the console 25'. Simultaneously, the currency dispenser 160 dispenses banknotes into the change drawer 191. It will be common practice to use dollar bills in the currency dispenser for use as change. In order to avoid premature depletion of the banknote supply in the currency dispenser, such as will occur when a purchaser inserts a 50-dollar bill into the currency validator and pumps only 10 dollars or less of gas, the currency validator memory will be programmed to limit the maximum amount bill which may be accepted for use with a motor fuel purchase. This will prevent, in the situation described above, from a large amount of banknotes from being dispensed at one time as change from the dispenser i.e., 40 1-dollar bills.

The present invention presents other advantages in operation. For example, it may include in the currency validator memory variants representative of foreign currency and the customer console controller 25' may include a separate foreign conversion package 195 as memory so that the local currency equivalent ("LCE") of the cash deposited may be calculated. In this operation, the cash acceptance means 123, 124 will have selected foreign currency and coin variants programmed in their memories for recognition. The LCE of the amount deposited by the purchaser is computed by the foreign currency conversion package 195 and the value of foreign cash deposited is then transmitted by the console controller 120 to the system controller 108, which totals the amount deposited. Any change due from the amount is calculated and dispensed to the purchaser in local currency. This aspect makes the present invention desirable for use at or near country borders frequented by nationals of each country, such as, for example: (1) Canadians and Americans; (2) French and Germans; (3) French and Swiss, etc.

Figure 19:
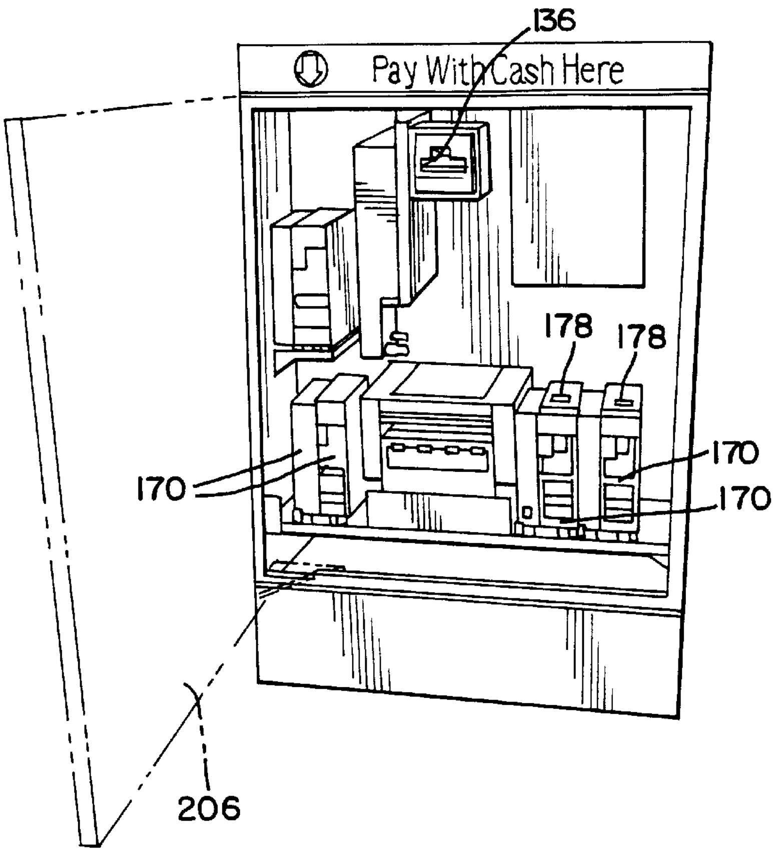
FIG. 19 is an elevational view of the customer console of the service station of FIG. 18 with its front panel opened to display its internal components.
Figure 20:
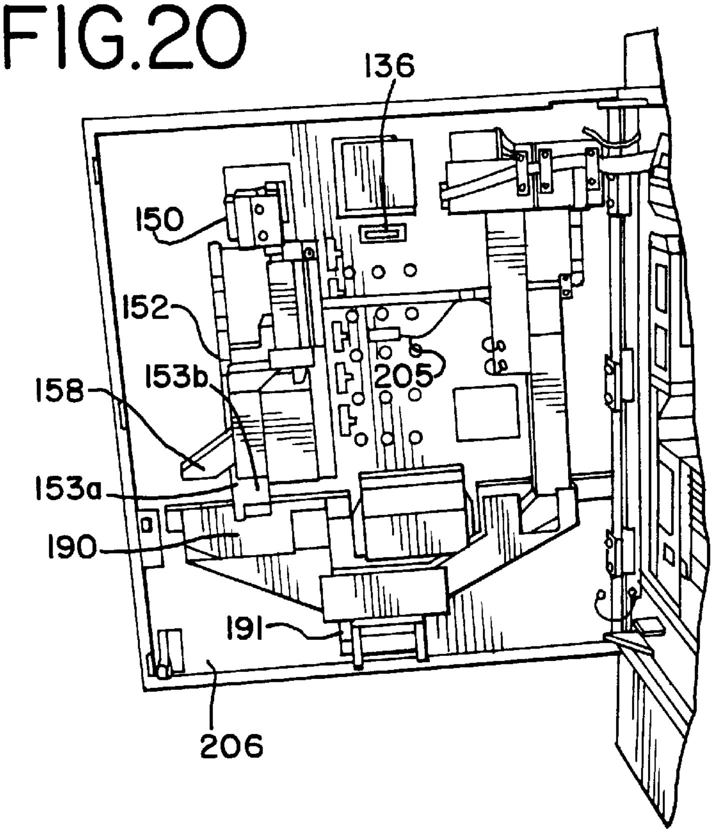
FIG. 20 is an elevational view of the interior of the front panel of the customer console of FIG. 19.

Alarm circuitry 205 may be incorporated into the console 25' to advise the operator of the station of certain conditions, such as an open front door 206 of the console housing 105 or of an attempt of vandalism or unauthorized access to the currency dispensing banknote supply cassette 162, the currency and coin accumulation vaults 148, 156 or coin dispensers. (FIGS. 19 & 20). The operation of the station may be monitored from a central command center by way of communication between the system controller 108 and the command center, such communication being effected by way of a modem, satellite link or other suitable communication means.

In the drawings and specification there has been set forth the best mode presently contemplated for the practice of the present invention, and although specific terms are employed, they are used in the generic and descriptive sense only and not for purposes of limitation, the scope of the invention being defined in the claims. It can be seen that the present invention therefore provides an automated service station and automated vending machine in the form of a customer cash console which entirely automates the purchase of motor fuels.

While the preferred embodiment of the invention have been shown and described, it will be understood by those skilled in the art that changes or modifications may be made thereto without departing from the true spirit and scope of the invention.

We claim:

1. A system for dispensing preselected quantities of motor fuel in return for a cash payment from a purchaser, comprising;

a motor fuel pump;

a cash acceptor for accepting and identifying values of cash deposited with the cash acceptor in the form of currency or coins by the purchaser;

a change dispenser for dispensing change to said purchaser when said purchaser pumps a quantity of motor fuel from said fuel pump of a value less than the value of said cash inserted by said purchaser with said cash acceptor, the change dispenser including at least two supplies of different denominations of cash, and at least two different change payout mechanisms operable to payout cash as change to said customer in currency or coin, or a combination of currency and coin and, control means operatively linking said motor fuel pump, cash acceptor and change dispenser together and for generating enabling signals to said motor fuel pump upon deposit of cash with said cash acceptor by said purchaser and identification of said value of said deposited cash by said acceptor.

2. The system of claim 1, further including a console that houses said cash acceptor and said change dispenser.

3. The system of claim 1, further including a sorter for sorting coins deposited by a purchaser with said cash acceptor as payment for fuel according to denomination and a recycling assembly for diverting certain of said coin denominations sorted by said sorter for use as change by at least one of said coin payout mechanisms.

4. The system of claim 1, including at least first and second coin dispensers for respectively dispensing first and second denomination coins as change, said system further including a sorter for sorting coins deposited by a purchaser with said cash acceptor according to denomination, said sorter directing coins of said first denomination for use by said first coin dispenser as change and said sorter directing coins of said second denomination to an accumulation area.

5. The system of claim 1, wherein said cash acceptor includes a sorter assembly for sorting coins deposited by a purchaser with said cash acceptor console as payment for fuel according to denomination and a coin accumulation vault, the coin sorter assembly including a plurality of coin paths for directing certain of said deposited coins to the coin accumulation vault and others of said deposited coins to said change dispenser for use thereof as change dispensed by said system as change.

6. The system of claim 1, further including an electronic card payment acceptor for accepting a payment from said purchaser by way of credit and debit cards and means for disabling operation of said cash acceptor, the card payment acceptor including a card reader for reading information resident on said credit and debit cards and a card validator for validating said credit and debit cards and initiating a disabling signal by said card payment acceptor to thereby enable operation of said fuel pump for a credit purchase of motor fuel while disabling operation of said cash acceptor for a cash purchase of said motor fuel.

7. The system of claim 1, further including means for identifying the values of two different sets currencies and coins, one set being local currency and coins and the other set being a preselected foreign currency and coins, and said customer console includes means for converting the value of cash deposited by a purchaser with said customer console in said preselected foreign currency and coin into an equivalent value of local currency and coin.

8. The system of claim 1, further including coin denomination rejection means for rejecting preselected denomination coins deposited with said cash acceptor.

9. The system of claim 1, further including a timing means activated by said purchaser depositing cash into said cash acceptor, said timing means including means for sending a disabling signal to said control means after a predetermined amount of time has elapsed after said purchaser deposits cash into said cash acceptor and no fuel is pumped, said disabling signal thereby disabling said motor fuel pump.

10. The system of claim 1, wherein said control means is disposed at a location remote from said motor fuel pump so as to permit the remote monitoring of cash acceptance and change dispensing by said system.

11. The system of claim 1, wherein said cash acceptor includes currency acceptance means for identifying respective denominations of currency deposited with said cash acceptor.

12. The system of claim 11, further including currency denomination rejection means for rejecting a preselected denomination of currency deposited with said cash acceptor.

13. The system of claim 1, further including a fueling island supporting said fuel pump, cash acceptor and change dispenser.

14. The system of claim 13, wherein said fuel pump is disposed within a first housing located on said fueling island and said cash acceptor and change dispenser are disposed together within a second housing located on said fueling island.

15. The system of claim 13, further including a console that houses said cash acceptor and change dispenser.

16. The system of claim 15, wherein said control means is housed within said console.

17. A system for dispensing preselected quantities of motor fuel in return for a cash payment from a purchaser, comprising;

a motor fuel pump;

a cash acceptor for accepting and identifying values and denominations of cash inserted into the cash acceptor in the form of currency or coins by the purchaser;

a change dispenser for dispensing change to said purchaser when said purchaser pumps a quantity of motor fuel from said fuel pump in an amount less than said cash amount inserted by said purchaser into said cash acceptor, the change dispenser including at least two supplies of different denominations of cash, and at least first and second change payout mechanisms being operable to payout cash as change to said customer respectively in currency or coin or a combination of currency and coin as needed;

a coin sorter for sorting coins deposited with said cash acceptor by denomination, the sorter directing certain denomination coins to a coin accumulation area of said system and directing at least one preselected denomination of coins back to said second change payout mechanism for use by said change dispenser in dispensing change to said purchaser.

18. The system of claim 17, wherein said coin accumulation area includes a vault, the coin sorter including at least one first coin path for directing said certain denomination coins deposited with said cash acceptor to said vault and at least one second coin path for directing said one preselected denomination of said deposited coins to said second change dispenser.

19. An automated module for use in association with a motor fuel pump, the module converting said motor fuel pump into a motor fuel vending pump that accepts cash as payment from a purchaser and selectively dispenses change due the purchaser resulting from a specific purchase of motor fuel by said purchaser, the module comprising:

a cash acceptor for accepting and identifying values of at least two different denominations of cash deposited with said cash acceptor in the form of currency or coins by said purchaser;

a change dispenser for dispensing cash as change to said purchaser when said purchaser pumps a quantity of motor fuel from said fuel pump of a value less than the value of said cash deposited with said cash acceptor by said purchaser, the change dispenser including at least two different change payout mechanisms operable to payout cash as change to said customer in the form of currency, coin or a combination of currency and coin equal to the difference between said value of cash deposited with said cash acceptor and said value of motor fuel pumped from said motor fuel pump by said purchaser; and, control means for operatively linking said motor fuel pump, said cash acceptor and said change dispenser together to enable operation of said motor fuel pump, said control means being capable of generating enabling signals to said motor fuel pump upon deposit of cash with cash acceptor by said purchaser and identification of said value of said deposited cash.

20. The module of claim 19, wherein said cash acceptor includes a sorter assembly for sorting coins deposited by a purchaser with said cash acceptor console as payment for fuel according to denomination and a coin accumulation vault, the coin sorter assembly including a plurality of coin paths for directing certain of said deposited coins to the coin accumulation vault and others of said deposited coins to said change dispenser for use thereof as change dispensed by said system as change.

21. The module of claim 19, further including means for identifying the values of two different sets currencies and coins, one set being local currency and coins and the other set being a preselected foreign currency and coins, and said customer console includes means for converting the value of cash deposited by a purchaser with said customer console in said preselected foreign currency and coin into an equivalent value of local currency and coin.

22. The module of claim 19, wherein said control means operatively links said module to a plurality of motor fuel pumps.

23. The module of claim 19, wherein said control means is operable from a location remote from said motor fuel pump.

24. The module of claim 19, further including a sorter for sorting coins deposited by a purchaser with said cash acceptor payment for fuel according to denomination.

25. The module of claim 24, further including a coin diverting assembly for diverting certain of said coin denominations sorted by said sorter as change with at least a selected one of said coin payout mechanisms.

26. The module of claim 19, wherein said cash acceptor includes currency acceptance means for identifying respective denominations of currency deposited with said cash acceptor, and said system further including currency denomination rejection means for rejecting a preselected denomination of currency deposited with said cash acceptor.

27. The module of claim 19, further including coin denomination rejection means for rejecting preselected denomination coins deposited with said cash acceptor.

28. The module of claim 19, wherein said module is housed within a housing located proximate to said motor fuel pump.

29. The module of claim 28, wherein said housing and motor fuel pump are mounted on a fueling island.

* * * * *